(12) United States Patent
Kinoshita et al.

(10) Patent No.: US 7,095,712 B2
(45) Date of Patent: Aug. 22, 2006

(54) METHOD AND APPARATUS FOR PROTECTION PATH SETUP

(75) Inventors: Hiroshi Kinoshita, Fukuoka (JP);
Ayako Hashimoto, Fukuoka (JP);
Takashi Hatano, Kawasaki (JP);
Satsuki Norimatsu, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 979 days.

(21) Appl. No.: 10/039,611

(22) Filed: Nov. 9, 2001

(65) Prior Publication Data

US 2002/0172149 A1 Nov. 21, 2002

(30) Foreign Application Priority Data

May 17, 2001 (JP) ............................. 2001-148197

(51) Int. Cl.
*G01R 31/08* (2006.01)
(52) U.S. Cl. ...................................... 370/217; 370/225
(58) Field of Classification Search ................ 370/216, 370/217, 218, 237; 709/239
See application file for complete search history.

(56) References Cited

U.S. PATENT DOCUMENTS 6,850,705 B1 * 2/2005 Su et al. ......................... 398/5

2001/0032271 A1 * 10/2001 Allen ........................ 709/239
2002/0133756 A1 * 9/2002 Jain ............................. 714/43
2004/0042402 A1 * 3/2004 Galand et al. ............... 370/237

FOREIGN PATENT DOCUMENTS

JP 06037783 2/1994
JP 10145374 5/1998

OTHER PUBLICATIONS

Huang, et al. A Path Protection/Restoration Mechanism for MPLS Networks Tellabs Operations, Inc. Jul. 2000.

* cited by examiner

*Primary Examiner*—Chau Nguyen
*Assistant Examiner*—Christopher Grey
(74) *Attorney, Agent, or Firm*—Katten Muchin Rosenman LLP

(57) ABSTRACT

When setting up a working path, a protection path is automatically set up by taking each node on the working path as a start point. A working path setup request message carrying "protection needed/not-needed" information is transmitted from an ingress node toward an egress node along the route of the working path. When transferring a path setup response message as a response to it, each node autonomously determines the route of the protection path and sends out a protection path setup request message along the route of the protection path.

22 Claims, 33 Drawing Sheets

PATH MANAGEMENT INFORMATION TABLE   95

Fig.25

INFORMATION SETUP IN PATH MANAGEMENT INFORMATION TABLE (WORKING PATH AT INGRESS NODE)

| FIELD NAME | SET VALUE | REMARKS |
|---|---|---|
| EGRESS OR PML NODE ID | 133.27.172.1 | SET UP DURING PATH MESSAGE PROCESSING |
| REQUIRED BANDWIDTH [Mbit/s] | 10 | |
| REQUIRED DELAY [ms] | 100 | |
| DELAY FROM INGRESS [ms] | 0 | |
| WORKING/PROTECTION IDENTIFICATION | 0: WORKING | |
| PROTECTION NEEDED/NOT-NEEDED | 1: PROTECTION NEEDED | |
| PATH STATE | PATH STATE:<br>1: PATH BEING SET UP<br>2: PATH BEING RELEASED<br>3: COMMUNICATING | |
| OUTPUT PORT NUMBER | 3 | |
| INPUT PORT NUMBER | 0 (NONE) | |
| EXPLICIT ROUTE STORING BUFFER ADDRESS | MEMORY ADDRESS | |
| END-TO-END DELAY | | SET UP DURING RESV MESSAGE PROCESSING |
| RESV RELAYING NODE STORING BUFFER ADDRESS | | |
| CORRESPONDING PATH ID | | |

Fig.26

INFORMATION SETUP IN PATH MANAGEMENT INFORMATION TABLE (WORKING PATH AT NODE B)

| FIELD NAME | SET VALUE | REMARKS |
|---|---|---|
| EGRESS OR PML NODE ID | 133.27.172.1 | |
| REQUIRED BANDWIDTH [Mbit/s] | 10 | |
| REQUIRED DELAY [ms] | 100 | |
| DELAY FROM INGRESS [ms] | 10 | |
| WORKING/PROTECTION IDENTIFICATION | 0: WORKING | SET UP DURING PATH MESSAGE PROCESSING |
| PROTECTION NEEDED/NOT-NEEDED | 1: PROTECTION NEEDED | |
| PATH STATE | PATH STATE:<br>1: PATH BEING SET UP<br>2: PATH BEING RELEASED<br>3: COMMUNICATING | |
| OUTPUT PORT NUMBER | 1 | |
| INPUT PORT NUMBER | 2 | |
| EXPLICIT ROUTE STORING BUFFER ADDRESS | MEMORY ADDRESS | |
| END-TO-END DELAY | 40 | |
| RESV RELAYING NODE STORING BUFFER ADDRESS | MEMORY ADDRESS | SET UP DURING RESV MESSAGE PROCESSING |
| CORRESPONDING PATH ID | NODE B (172.27.171)+<br>LSP_ID (2) | |

Fig.27

INFORMATION SETUP IN PATH MANAGEMENT INFORMATION TABLE (PROTECTION PATH AT NODE B)

| FIELD NAME | SET VALUE | REMARKS |
|---|---|---|
| EGRESS OR PML NODE ID | 133.27.171.1 | |
| REQUIRED BANDWIDTH [Mbit/s] | 10 | |
| REQUIRED DELAY [ms] | 100 | |
| DELAY FROM INGRESS [ms] | 10 | |
| WORKING/PROTECTION IDENTIFICATION | 1: PROTECTION | SET UP DURING PATH MESSAGE PROCESSING |
| PROTECTION NEEDED/NOT-NEEDED | 0: PROTECTION NOT NEEDED | |
| PATH STATE | PATH STATE:<br>1: PATH BEING SET UP<br>2: PATH BEING RELEASED<br>3: COMMUNICATING | |
| OUTPUT PORT NUMBER | 2 | |
| INPUT PORT NUMBER | 2 | |
| EXPLICIT ROUTE STORING BUFFER ADDRESS | MEMORY ADDRESS | |
| END-TO-END DELAY | 60 | |
| RESV RELAYING NODE STORING BUFFER ADDRESS | MEMORY ADDRESS | SET UP DURING RESV MESSAGE PROCESSING |
| CORRESPONDING PATH ID | NODE A (172.27.170)+<br>LSP_ID (1) | |

EXPLICIT ROUTE STORING BUFFER 96

Fig.29

INFORMATION SETUP IN EXPLICIT ROUTE STORING BUFFER
(WORKING PATH AT INGRESS NODE)

| FIELD NAME | SET VALUE |
|---|---|
| Path RELAYING NODE 1 | 172.27.171.1 (NODE B) |
| Path RELAYING NODE 2 | 172.27.172.1 (NODE C) |

Fig.31

INFORMATION SETUP IN Resv RELAYING NODE STORING BUFFER
(WORKING PATH AT NODE B)

| FIELD NAME | SET VALUE |
|---|---|
| Resv RELAYING NODE 1 | 172.27.172.1 (NODE C) |
| Resv RELAYING NODE 2 | 133.27.171.1 (NODE D) |
| Resv RELAYING NODE 3 | 133.27.172.1 (NODE E) |

Fig.33

INFORMATION SETUP IN BANDWIDTH/DELAY MANAGEMENT TABLE
(OUTPUT PORT 3 OF INGRESS NODE)

| FIELD NAME | SET VALUE |
|---|---|
| PHYSICAL BANDWIDTH [Mbit/s] | 10240 |
| BANDWIDTH IN USE [Mbit/s] | 5000 |
| UNUSED BANDWIDTH [Mbit/s] | 5240 |
| OUTPUT PORT PROPAGATION DELAY [ms] | 10 |

Fig.34

INFORMATION SETUP IN BANDWIDTH/DELAY MANAGEMENT TABLE
(OUTPUT PORT 1 OF NODE B)

| FIELD NAME | SET VALUE |
|---|---|
| PHYSICAL BANDWIDTH [Mbit/s] | 10240 |
| BANDWIDTH IN USE [Mbit/s] | 1000 |
| UNUSED BANDWIDTH [Mbit/s] | 9240 |
| OUTPUT PORT PROPAGATION DELAY [ms] | 10 |

Fig.35

INFORMATION SETUP IN BANDWIDTH/DELAY MANAGEMENT TABLE
(OUTPUT PORT 2 OF NODE B)

| FIELD NAME | SET VALUE |
|---|---|
| PHYSICAL BANDWIDTH [Mbit/s] | 10240 |
| BANDWIDTH IN USE [Mbit/s] | 2000 |
| UNUSED BANDWIDTH [Mbit/s] | 8240 |
| OUTPUT PORT PROPAGATION DELAY [ms] | 10 |

WORKING/PROTECTION STATUS MANAGEMENT TABLE 102

METHOD AND APPARATUS FOR PROTECTION PATH SETUP

BACKGROUND OF THE INVENTION

1. Field of the Invention

The present invention relates to a method of setting up a protection path for restoring a link or node failure on a working path established in a network, and an apparatus for implementing the method.

With the widespread use of the Internet in recent years, the demand for high transmission efficiency and quality has been increasing. To achieve this, a technology for superimposing IP packets on a physical link with the smallest possible overhead (for example, IP over DWDM (Dense WDM)) and Multi Protocol Label Switching (MPLS) as a means for achieving low-cost and high-speed transmission of IP packets at the hardware level have been attracting attention. In these circumstances, since the protection that has traditionally been provided at a lower layer such as SONET/SDH can no longer be provided, packet protection, a scheme for providing protection at a higher layer, is needed.

2. Description of the Related Art

In this era where the IP packet is recognized as a basic transmission unit, there is a tendency for lower layers such as SDH/SONET to be rendered unnecessary and, for failure restoration in a network, packet protection, a scheme for accomplishing restoration on a packet-by-packet basis, has been receiving attention.

In packet protection, a protection switch node (hereinafter abbreviated PSL) and a protection merge node (hereinafter abbreviated PML) are determined on a working path, and a different path that does not overlap with the working path is set up from the PSL to the PML. If a failure occurs along the segment between the PSL and PML on the working path, a node that has detected the failure sends a failure notification to the PSL which then reroutes the traffic over the protection path. There are no provisions for the number of links between the PSL and PML (the range of failure to be restored by one protection path), and various repair schemes such as global repair and local repair are currently being proposed. However, the method of implementing the packet protection, including the method of determining the PSL and PML on the working path, the method of setting up the protection path, and the method of switching, has not yet been clearly defined.

Among the various repair schemes currently proposed, local repair, in which a node that detects a failure or its adjacent node performs switching to the protection path, is attracting particular attention because of its capability to accomplish switching within 50 ms and its simple mechanism.

As a method of implementing such packet protection, a path protection method using MPLS that enables high-speed packet forwarding is described in a document presented to IETF by Tellabs (draft-change-mpls-rsvpte-path-protection-00.txt, draft-change-mpls-rsvptepath-protection-01.txt).

In this document, the following provisions for achieving faster switching to a protection path are described without limiting the repair scheme to any particular method.

For protection path setup, it is recommended that a protection path be set up in advance in order to reduce the switching time. In a specific method of path setup, the PSL on the working path determines the PML from among the downstream nodes on the working path, and determines the route of the protection path in accordance with a path selection algorithm in such a manner that the protection path does not overlap with the working path between the PSL and PML. The PML merges the outgoing end of the protection path into an outgoing path of the corresponding working path. It is specified that the protection path thus set up be required to satisfy the same QoS requirements (bandwidth and delay requirements) as the corresponding working path.

The switchover from the working to the protection path is initiated by sending a failure notification from a downstream node that has detected the failure to the PSL located on the upstream side. High priority is given to the failure notification. Each node extracts the destination of the failure notification based on the RNT created in advance during the establishment of the path, and performs label switching by using an inverse-cross-connect table. This, as it is proposed in the document, contributes to speeding up the notification of a failure and reducing the switching time.

To provide packet protection, it is required that the same bandwidth as that for the working path be guaranteed for its protection path through which no traffic flows before protection switching. If the same bandwidth is to be reserved not only for the working path but also for its protection path, the total number of paths required in the entire network increases as the PSL to PML distance becomes shorter, and more than twice the bandwidth of the working path will become necessary for the network as a whole, reducing the efficiency of network resource utilization. Accordingly, for the realization of packet protection, it is becoming important to also consider a "bandwidth sharing scheme" which aims at saving network resources by sharing the bandwidth among protection paths, but this scheme is difficult to implement; in fact, the method proposed by Tellabs only describes the following condition and does not provide any specific method of implementation.

The condition for bandwidth sharing: Protection paths provided for a plurality of working paths that do not share any nodes between PSL and PML can share the bandwidth (since the bandwidth will not become necessary simultaneously if the occurrence of a double failure is not considered). The shared protection path bandwidth must be equal to the maximum of the bandwidths in the plurality of corresponding paths.

Japanese Patent No. 2985940 discloses a method in which, when establishing a working path in a large-scale network, complete source route information of the working path is acquired by the ingress node of the path in order to set up a protection route and, when setting up a protection path, the source route information is added to signaling information for connection setup, thereby setting up a physical path entirely different from the working path. With this method, however, when a failure occurs, the failure must be reported all the way to the ingress node; this not only takes time to switch to the protection path, but ends up being unable to guarantee the same QoS (bandwidth and delay) as that for the working path when the path is switched to the protection path.

The protection scheme presented by Tellabs only describes the path setup conditions. When the protection path is set up manually in accordance with the conditions, working/protection switchover can be accomplished within the required time, i.e., 50 ms, but the problem is that everything has to be managed manually, requiring an enormous number of maintenance cost.

Furthermore, though the protection scheme is described on the premise that the PSL recognizes the topology up to the PML, if this scheme is applied in a large-scale network that uses the concept of "area", control may not be able to be performed because a node in a certain area cannot recognize the topology outside the area. For example, when setting up a protection path bypassing an area border node, the proposed scheme has the problem that the PSL cannot determine a node outside the area as the PML, nor can a route be selected that does not overlap with the working path. In this case, the path can be set up if maintenance personnel explicitly specify the protection path route, but there is a limit to the kinds of topologies that maintenance personnel can recognize and, as one can easily imagine, they are prone to error.

As for the protection path delay guarantee, the end-to-end delay when routed via the protection path must be guaranteed. The problem here is that with the PSL-to-PML delay information alone, it is not possible to guarantee the end-to-end delay, and the scheme proposed by Tellabs does not provide any specific means to address this issue.

SUMMARY OF THE INVENTION

In view of the above-outlined problems, it is an object of the present invention to provide a protection path setup method and apparatus that can automatically set up a protection path capable of guaranteeing QoS and sharing the bandwidth, even at an intermediate node along a working path and regardless of the network size.

According to the present invention, there is provided a protection path setup method comprising the steps of: (a) setting up a working path from a start-point node to an end-point node; and (b) setting up a plurality of protection paths by taking a plurality of nodes on the working path as respective start points at the time of setting up the working path.

Preferably, the step (a) includes the substeps of: transferring a working path setup request message containing therein a protection path request from the start point to the end point of the working path along the route of the working path being set up; and setting up the working path by transferring a working path setup response message from the end point to the start point of the working path in response to the working path setup request message, and the step (b) includes the substeps of:

transferring a protection path setup request message from the start point to the end point of each of the plurality of protection paths in response to the protection path request contained in the working path setup request message; and setting up each of the plurality of protection paths by transferring a protection path setup response message from the end point to the start point of the protection path in response to the protection path setup request message.

According to the present invention, there is also provided a node apparatus comprising: means for setting up a working path with its own node as a start point; and means for setting up a protection path with its own node as a start point during the setting up of the working path.

According to the present invention, there is also provided a node apparatus comprising: means for setting up a working path passing through its own node; and means for setting up a protection path with its own node as a start point during the setting up of the working path.

According to the present invention, there is also provided a node apparatus comprising: means for setting up a working path with its own node as an end point; and means for setting up a protection path with its own node as an end point during the setting up of the working path.

BRIEF DESCRIPTION OF THE DRAWINGS

FIG. 25 is a diagram showing a first example of information set up in the path information management table;

FIG. 26 is a diagram showing a second example of information set up in the path information management table;

FIG. 27 is a diagram showing a third example of information set up in the path information management table;

FIG. 29 is a diagram showing one example of information set up in the explicit route storing buffer;

FIG. 31 is a diagram showing one example of information set up in the Resv relaying node storing buffer;

FIG. 33 is a diagram showing a first example of information set up in the bandwidth/delay management table;

FIG. 34 is a diagram showing a second example of information set up in the bandwidth/delay management table;

FIG. 35 is a diagram showing a third example of information set up in the bandwidth/delay management table;

DESCRIPTION OF THE PREFERRED EMBODIMENTS

One example of a protection path setup method according to the present invention will be described below with reference to FIGS. 1 to 8.

Figure 1:
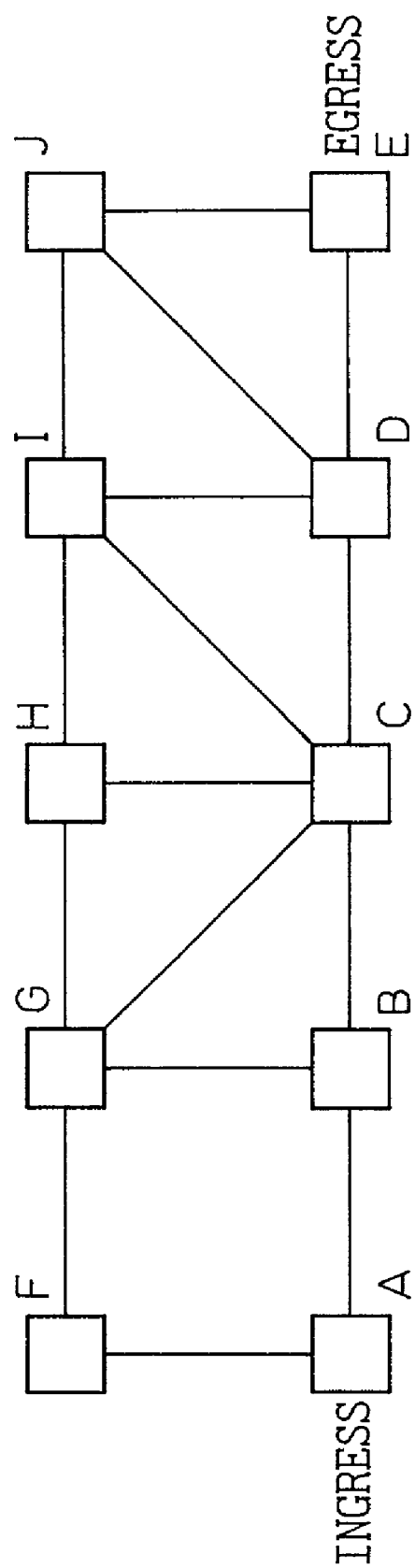
FIG. 1 is a diagram for explaining one example of a protection path setup method according to the present invention.

Assuming the case where there are links connecting between nodes A to J as shown in FIG. 1, a description will be given of procedures for setting up a path from node A to node E via nodes B, C, and D, with the node A as the ingress node and the node E as the egress node, while at the same time, setting up local repair protection paths for restoring node or link failures on the above path.

Figure 2:
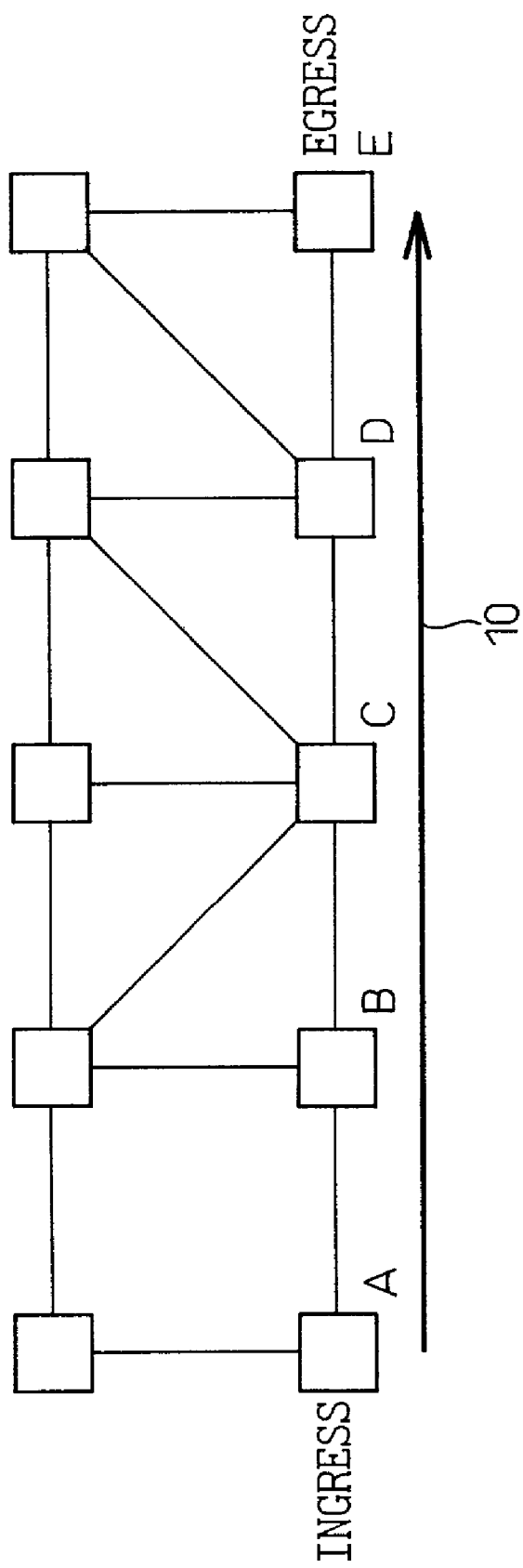
FIG. 2 is a diagram for explaining one example of the protection path setup method according to the present invention.

First, as shown in FIG. 2, a path setup request message 10 is sent from the ingress node A toward the egress node E along the route of the working path to be set up. The path setup request message 10 carries, in addition to the information contained in an ordinary path setup request, "protection needed/not-needed" information indicating whether the setting up of a protection path is requested or not. When setting up a protection path simultaneously with the working path, the "protection needed/not-needed" information is set to "protection needed", and each node stores this "protection needed/not-needed" information.

Figure 3:
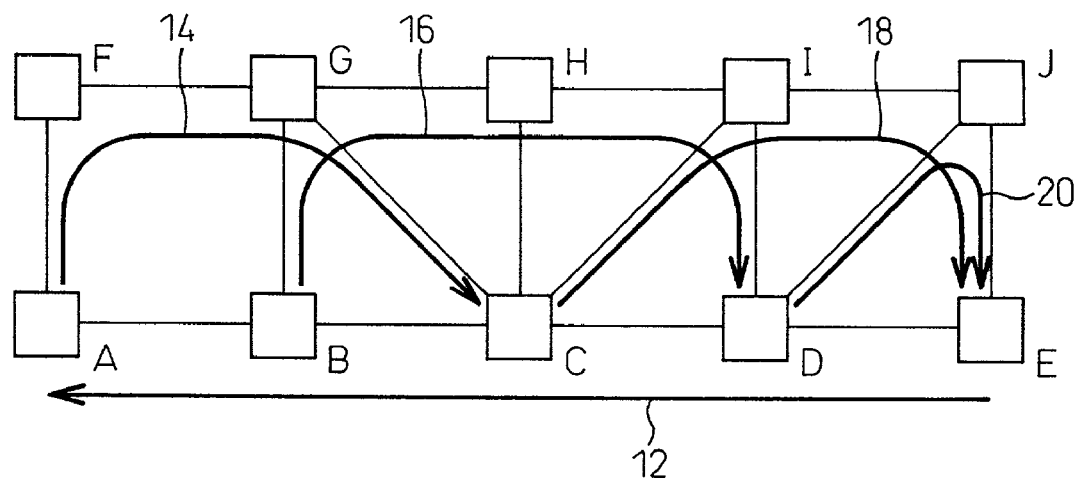
FIG. 3 is a diagram for explaining one example of the protection path setup method according to the present invention.

Then, as shown in FIG. 3, in response to the path setup request message 10, a path setup response message 12 is sent from the egress node E toward the ingress node A along the route of the path, as in the prior art. Each of the nodes D to A that received the path setup response message 12 examines the "protection needed/not-needed" information contained in the above path setup request message 10. If the information indicates "protection needed", each node determines a protection path route by setting itself as the start-point node (PSL), and sends a protection path setup request message to the end-point node (PML) along the route to be set up. In the example of FIG. 3, the nodes A to C, which are not adjacent to the egress node, respectively determine the routes for restoring node failures at their adjacent nodes B to D downstream on the working path being set up and link failures on both sides of these adjacent nodes, and send out path setup request messages 14, 16, and 18 on the respective routes. The node D adjacent to the egress node E determines the route of the protection path for restoring a failure on the link connecting to the egress node E, and sends out a path setup request message 20.

Figure 4:
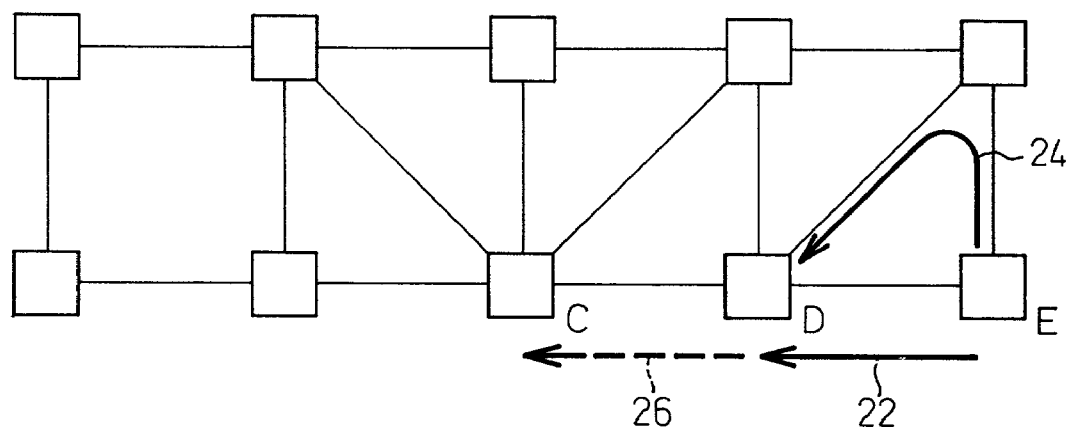
FIG. 4 is a diagram for explaining one example of the protection path setup method according to the present invention.

As shown in FIG. 4, the egress node E that received the working path setup request message 10 (FIG. 2) carrying the "protection needed" information sends a protection result notification 22 to the upstream node D along the working path. The node E, also responding to the protection path setup request message 20 (FIG. 3), sends out a protection path setup response message 24 along the route of the protection path. The node D sends a protection result notification 26 to the upstream node C along the working path after receiving both the protection result notification 22 and the protection path setup response message 24.

Figure 5:
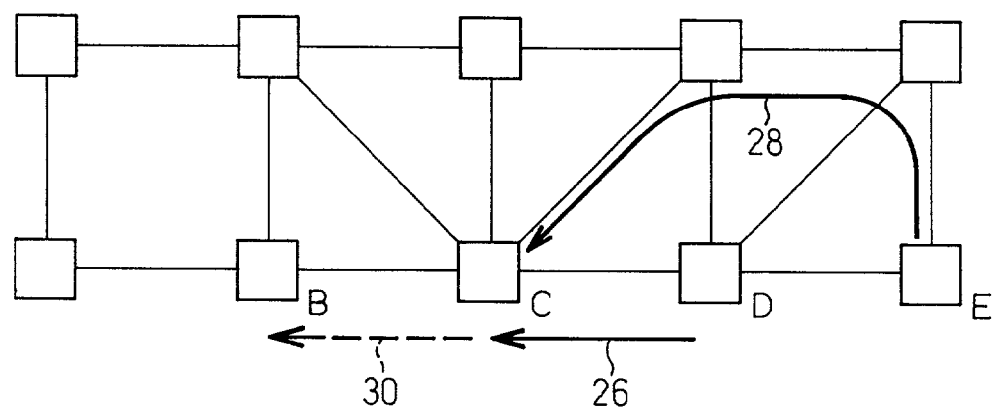
FIG. 5 is a diagram for explaining one example of the protection path setup method according to the present invention.
Figure 6:
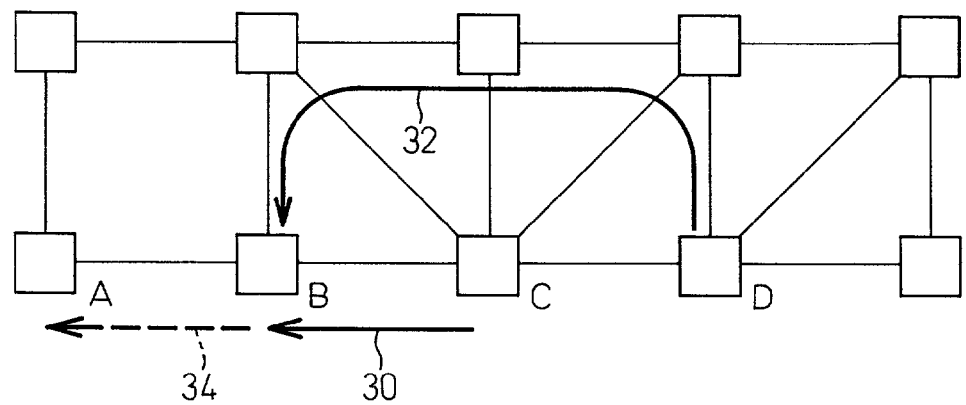
FIG. 6 is a diagram for explaining one example of the protection path setup method according to the present invention.

As shown in FIG. 5, the node C sends a protection result notification 30 to the upstream node B along the working path after receiving both the protection result notification 26 and path setup response message 28. Likewise, as shown in FIG. 6, the node B sends a protection result notification 34 to the upstream node A along the working path after receiving both the protection result notification 30 and path setup response message 32.

Figure 7:
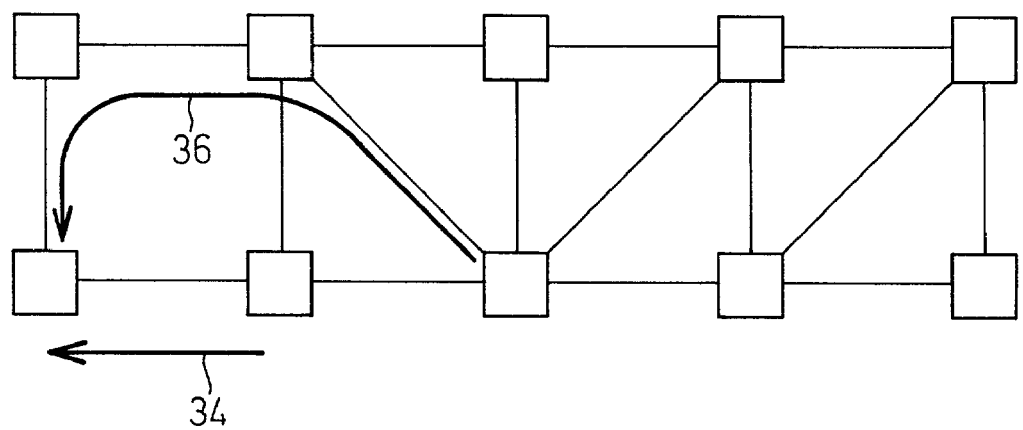
FIG. 7 is a diagram for explaining one example of the protection path setup method according to the present invention.

By receiving the protection result notification 34 and path setup response message 36, as shown in FIG. 7, the ingress node A knows that all the protection paths have been set up. In this way, the working path 38 and the protection paths 40, 42, 44, and 46 are set up as shown in FIG. 8.

Figure 8:
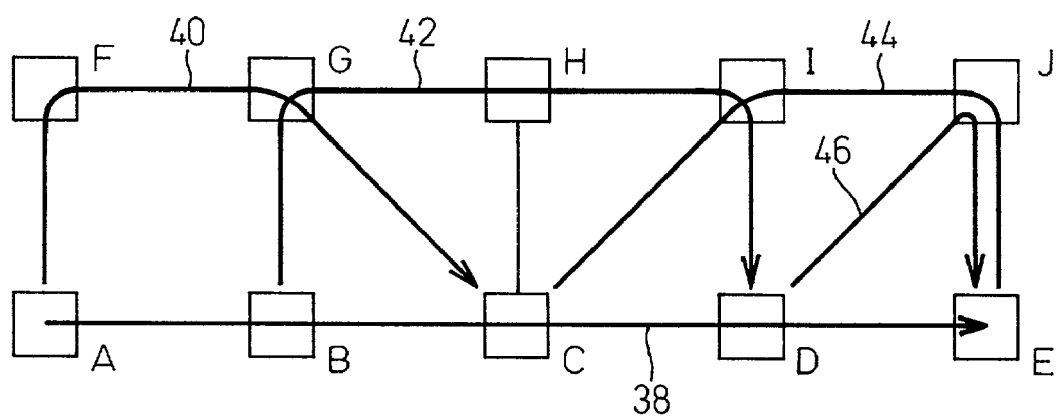
FIG. 8 is a diagram for explaining one example of the protection path setup method according to the present invention.

In FIG. 8, since there is no possibility that both the protection paths 44 and 46 will be used simultaneously, the protection paths can share the bandwidth on the link between the nodes E and J.

When there are already other working and protection paths before the setting up of the working path 38, if the occurrence of a double failure is not considered, there is no possibility that any one of the protection paths for the newly established working path will be used simultaneously with any one of the protection paths for the already established working path that does not share any nodes with the newly established working path between the PSL and PML on the existing working path; therefore, the bandwidth can be shared among them. In this case, of the plurality of bandwidth-sharing protection paths, the bandwidth of the protection path that requires the largest bandwidth is reserved as the bandwidth to be shared.

When transferring the path setup response message 12 (FIG. 3), each node may add its own identifier to the message. With this provision, since each node can identify its downstream nodes on the working path by receiving the path setup response message, it becomes possible to set up a protection path in a large-scale network where each individual node is unable to keep track of the entire topology.

Figure 9:
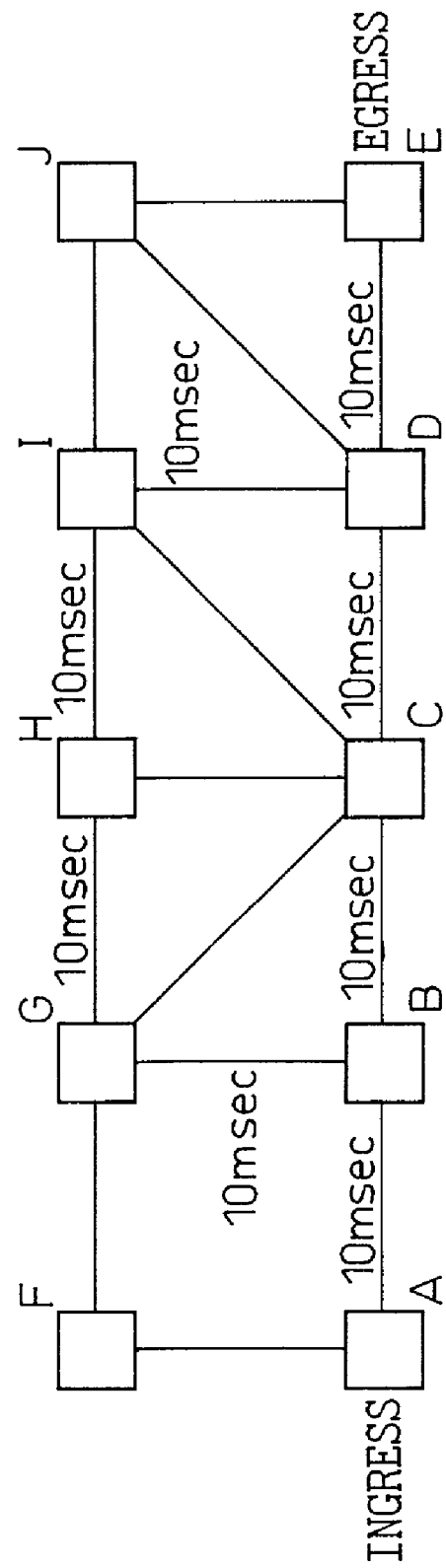
FIG. 9 is a diagram for explaining a delay estimation process according to the present invention.
Figure 10:
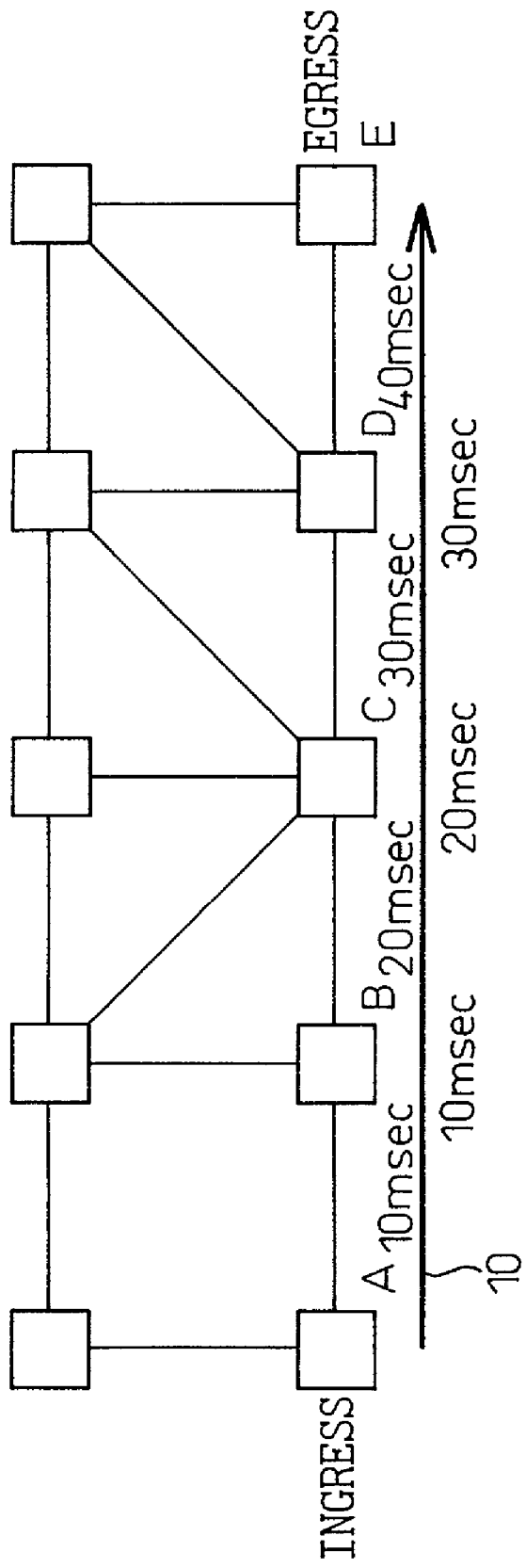
FIG. 10 is a diagram for explaining a delay estimation process according to the present invention.
Figure 11:
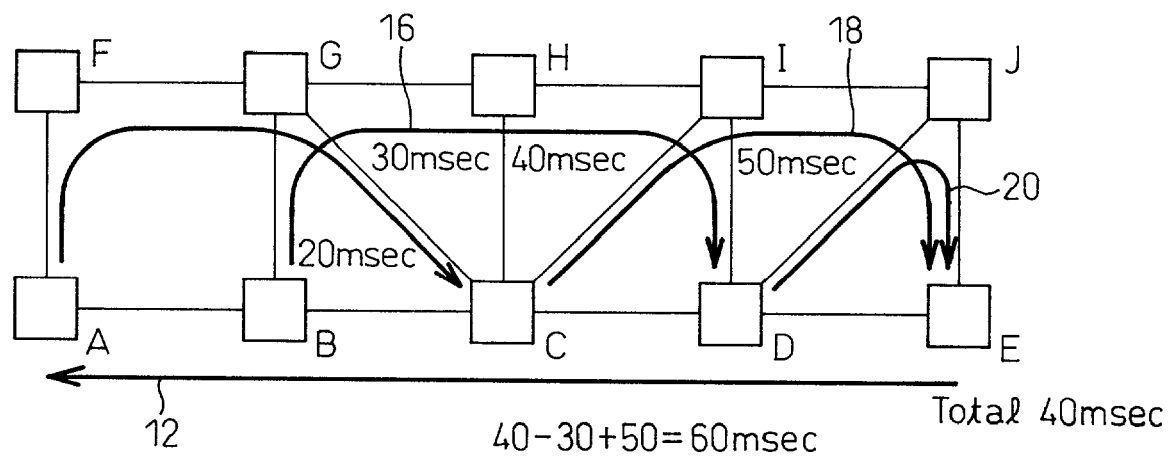
FIG. 11 is a diagram for explaining a delay estimation process according to the present invention.

When determining the protection path route, it is desirable that the route be determined so that the delay from the ingress node (node A) to the egress node (node E), when switching is made to the protection path, satisfies the delay requirement demanded of the working path. According to the prior art, if it is assumed that each link has a delay such as shown in FIG. 9, when transferring the path setup request message 10 the delay on each link is added up to calculate the total delay, as shown in FIG. 10, and the total delay of 40 msec is reported to the ingress node by means of the path setup response message 12, as shown in FIG. 11. In the present invention, the amount of delay reported by the path setup request message 10 is stored at each node, that is, each node stores the accumulated delay from the ingress node to that node, as shown in FIG. 10. Then, by subtracting this value from the total delay reported by the path setup response message 12, each node knows the delay from that node to the egress node. When transmitting the protection path setup request message 16, as shown in FIG. 11, the node B as the PSL sets the delay (20 msec) from the ingress node to the node B as the initial value, and at each subsequent node, the delay on its incoming link is added up to calculate the delay accumulated from the ingress node. The node D as the PML calculates the delay from the node D to the egress node by subtracting the delay of 30 msec from the node A to the node D on the working pass from the total delay of 40 msec on the working path, and adds the thus calculated delay of 10 msec to the delay of 50 msec from the ingress node to the node D on the route via the protection path, thereby computing the total delay of 60 msec that will occur when switched to the protection path.

Next, a description will be given of procedures for simultaneously releasing the working path 38 and protection paths 40, 42, 44, and 46 established as shown in FIG. 8.

Figure 12:
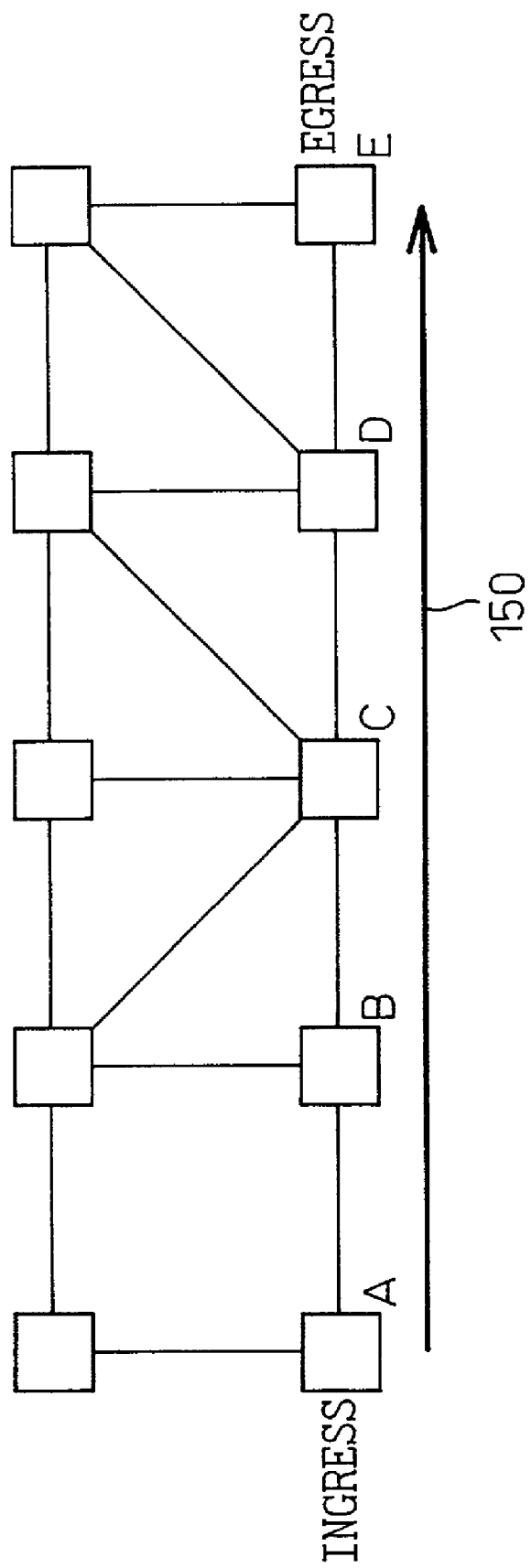
FIG. 12 is a diagram for explaining a path release process according to the present invention.
Figure 13:
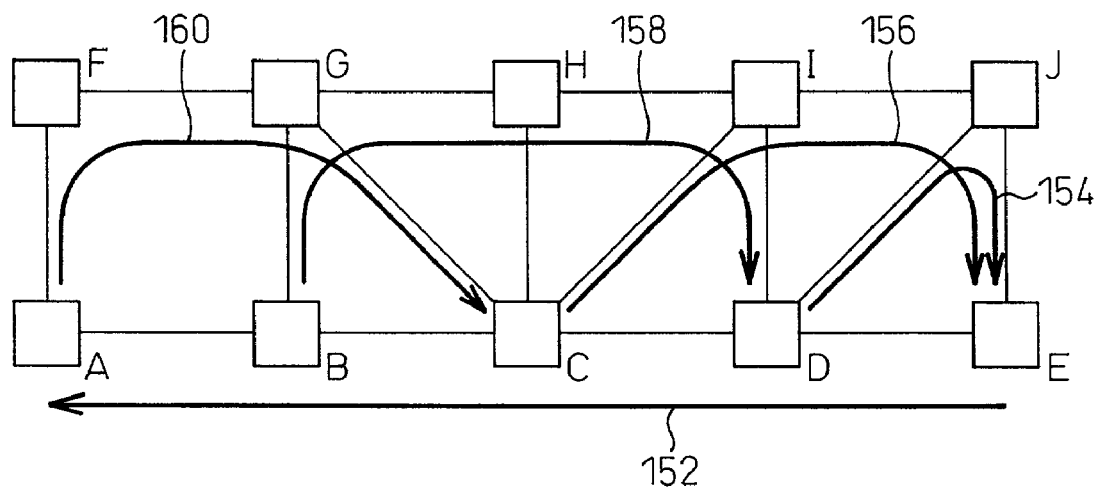
FIG. 13 is a diagram for explaining a path release process according to the present invention.

As shown in FIG. 12, first a path setup request message 150 containing "protection not needed" as the "protection needed/not-needed" information is transferred from the ingress node A to the egress node E, and each node on the path stores this information. When a path setup response message 152 is transferred in response to the path setup request message 150, as shown in FIG. 13, the receiving nodes, recognizing that the path requested for establishment is already established, and that the new request indicates "protection not needed", send out path release request messages 154, 156, 158, and 160, respectively, along the already established protection path routes.

Figure 14:
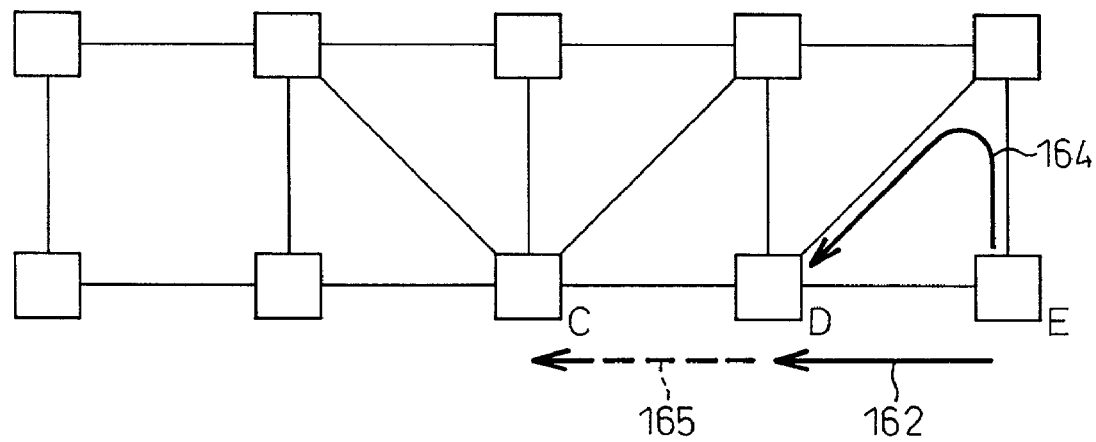
FIG. 14 is a diagram for explaining a path release process according to the present invention.

On the other hand, the egress node E that received the path setup request message carrying the "protection not-needed" information sends a protection result notification (release OK) 162 to the upstream node D along the working path, as shown in FIG. 14, while at the same time, transmitting out the path setup response message 152. Further, the node E as the PML releases the protection path in response to the protection path release request message 154 (FIG. 13) received from the node D, and sends out a protection path release response message 164 toward the PSL node D. The node D sends a protection result notification (release OK) 165 to the upstream node C along the working path after receiving both the protection result notification (release OK) 162 and the path release response message 164.

Figure 15:
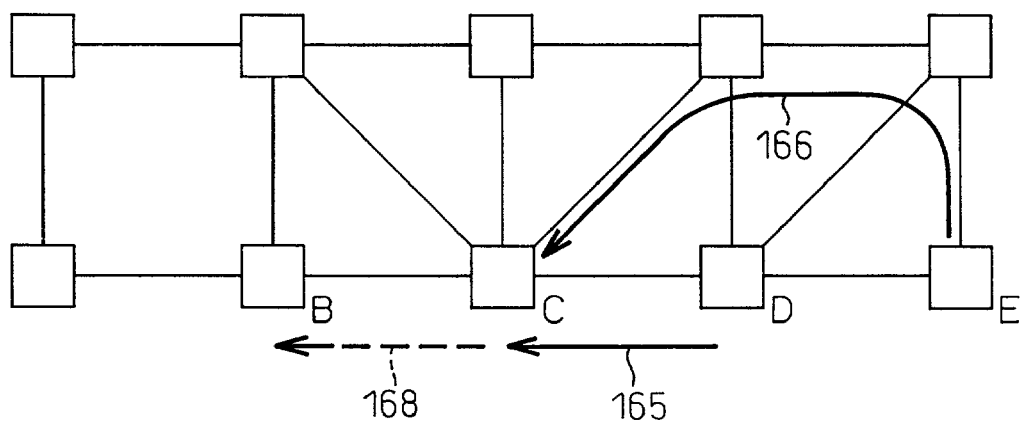
FIG. 15 is a diagram for explaining a path release process according to the present invention.
Figure 16:
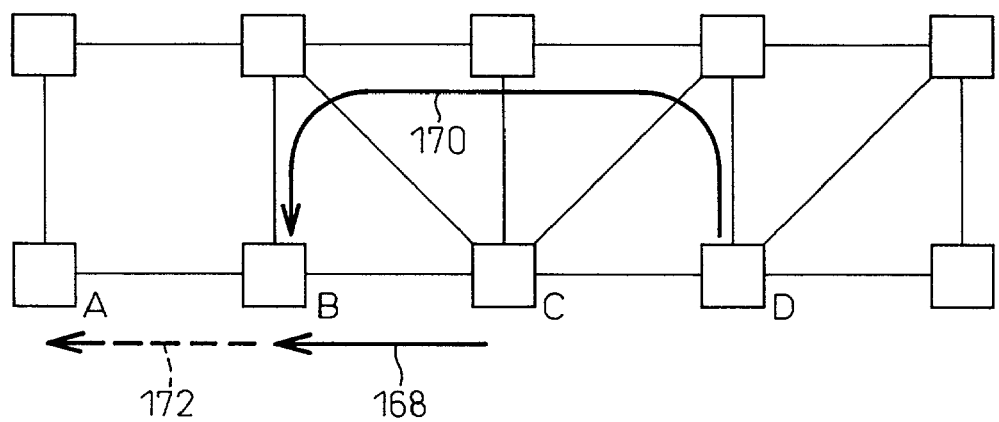
FIG. 16 is a diagram for explaining a path release process according to the present invention.

Next, as shown in FIG. 15, the node C sends a protection result notification (release OK) 168 to the node B after receiving the protection result notification (release OK) 165 from the node D and path release response message 166 from the node E. Likewise, the node B, as shown in FIG. 16, sends a protection result notification (release OK) 172 to the node A after receiving the protection result notification (release OK) 168 from the node C and path release response message 170 from the node D.

Figure 17:
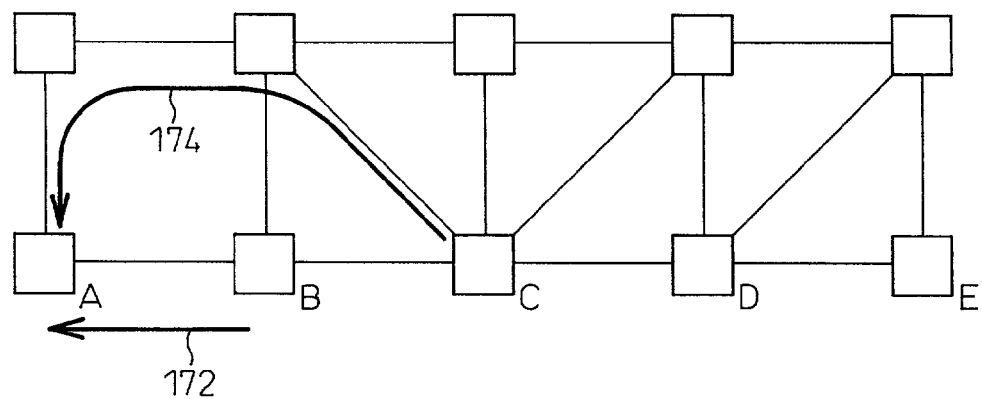
FIG. 17 is a diagram for explaining a path release process according to the present invention.
Figure 18:
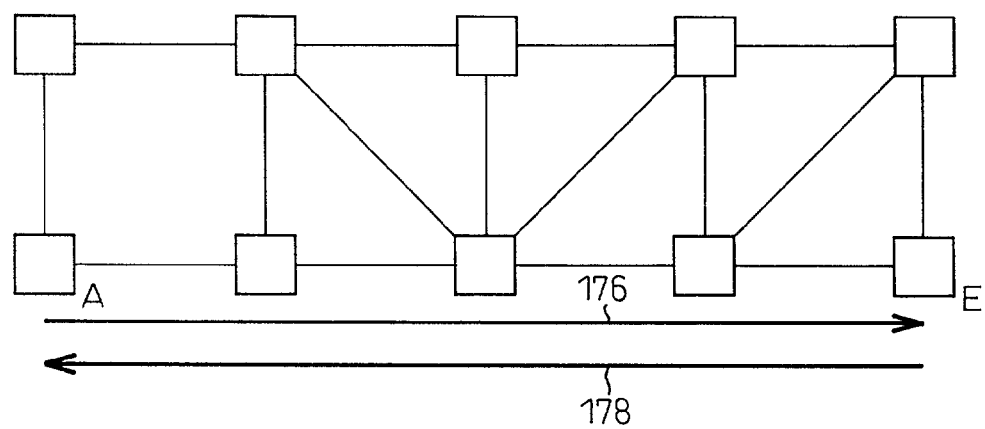
FIG. 18 is a diagram for explaining a path release process according to the present invention.

By receiving the protection result notification (release OK) 172 from the node B and path release response message 174 from the node C, as shown in FIG. 17, the node A confirms that all the protection paths have been released. After that, as shown in FIG. 18, the node A transmits a working path release request message 176 to the node E which, in response, returns a path release response message 178, whereupon the working path is released.

Figure 19:
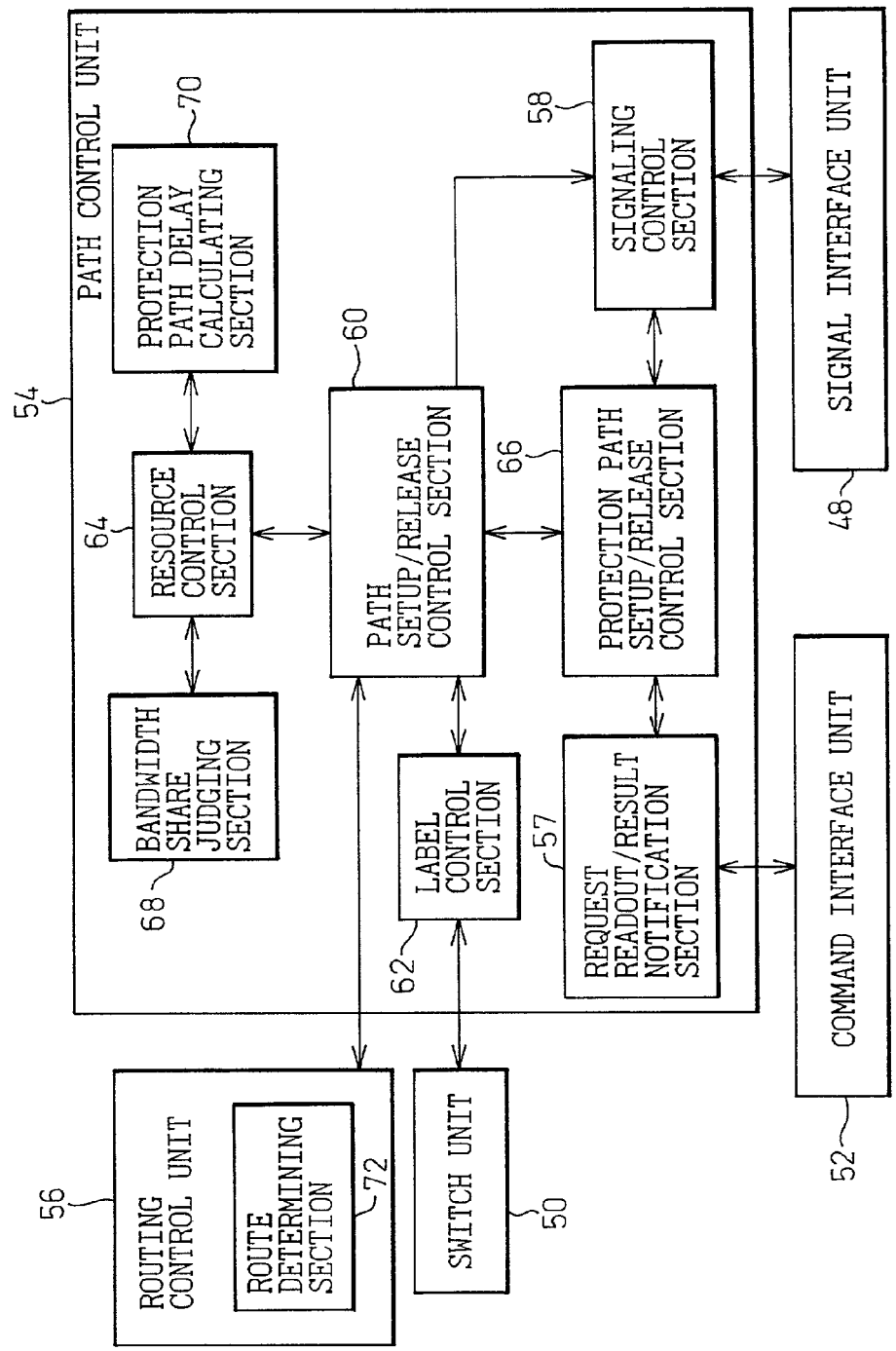
FIG. 19 is a diagram showing the configuration of a node apparatus according to the present invention.

FIG. 19 shows the configuration of a node apparatus according to one embodiment of the present invention. A signal interface unit 48 is connected to an adjacent node and acts as an interface for transmitting and receiving packets. A switch unit 50 determines output information, such as the next node and the outgoing interface (port), from the received packet information in order to deliver the received packet to the egress node, and switches the packet to the outgoing link. A command interface unit 52 accepts a command from maintenance equipment and transmits out the execution result of the command. A path control unit 54 accepts a path setup/release request and performs the setup/release of the requested path. A routing control unit 56 searches the routing information maintained in the node and determines the route that satisfies the path condition.

Various parts of the path control unit 54 will be described below. A request readout/result notification section 57 reads out a path setup/release request command entered by maintenance personnel and notifies the maintenance personnel of the result of the execution of the command.

A signaling control section 58 has the function of transmitting and receiving signaling messages for path setup and release control operations. The signaling control section 58 further includes the following functions.

(a) Setting up of "protection needed/not needed" information

Sets up "protection needed/not-needed" information in a working path setup signaling message (path setup request message) in accordance with a request from maintenance personnel.

(b) Setting up of bandwidth share information

Sets up in a protection path setup signaling message (path setup request message) path information necessary to determine whether bandwidth sharing is possible or not at the signaling message receiving node.

(c) Setting up of relaying node information

Sets up its own node information in a signaling message (path setup response message) to be returned as a response to a working path setup request message that also carries a protection path setup request. With this control function, each node can recognize the other nodes along the path from that node to the egress node.

(d) Setting up of bypassed ABR information

If the current node is a node located on the upstream side of an ABR (Area Border Router) to be bypassed, then sets up information indicating the ABR to be bypassed in the protection path setup signaling message (path setup request message) and transmits it to another ABR.

(e) Setting up of information indicating the delay from the ingress node

When setting up a protection path for a path having a delay requirement, sets up information, indicating the delay from the ingress node to the current node, in the protection path setup signaling message.

(f) Transmission of protection result notification

Transmits a protection result notification to notify the upstream node of the result of the protection path setup.

A path setup/release control section 60 has the function of controlling the establishing and releasing of a working path and managing the established working path. The path setup/release control section 60 further includes the following functions.

(a) Management of protection path

Manages information of the working path corresponding to the established protection path, route information of the protection path, bandwidth used, etc.

(b) Protection path setup control

In response to a protection path setup instruction, issues instructions to determine the route of the protection path, check resources, etc. and, based on the result, decides whether or not to set up the protection path.

(c) Protection path release control

In response to a protection path release instruction, issues an instruction to release resources such as bandwidth, label, etc. and issues a signaling request for releasing the protection path.

A label control section 62 manages labels used for each port and sets data into the switch unit. It performs label assignment when setting up a path and label releasing when releasing the path.

A resource control section 64 manages bandwidths, such as the physical bandwidth for each port and the bandwidth used, as well as the delay time to the adjacent node, and checks these resources when setting up a path. If the node is the PML, the resource control section 64 checks whether the delay requirement is satisfied or not, based on the calculation result of the delay from the ingress node to the egress node along the route via the protection path.

A protection path setup/release control section 66 has the following functions.

(a) Storing of "protection needed/not-needed" information

Controls whether protection is needed or not needed for the working path that is going to be established.

(b) Working path/protection path setup instruction

Examines a request received from maintenance personnel or a path setup request sent by signaling from other node, and issues a working path/protection path setup instruction.

(c) Working path/protection path release instruction

Examines a request received from maintenance personnel or a path release request sent by signaling from other node, and issues a working path/protection path release instruction.

(d) Protection path setup/release result notification

Upon completion of the setup or release of a protection path, sends a protection result notification to the upstream node.

(e) Result notification to maintenance personnel

Sends a result notification to maintenance personnel upon confirming at the ingress node that all the protection paths have been set up or released.

A bandwidth share judging section 68 judges whether the protection path can share the bandwidth with the already established protection path at the output port of the protection path. If it is determined that the bandwidth can be shared, processing for bandwidth sharing is performed for each output port. The bandwidth of the path that requires the largest bandwidth among the bandwidth-shareable paths is managed as the shareable bandwidth. When releasing the path, the bandwidth share is changed accordingly. When releasing the path, if any other path is using the bandwidth, the bandwidth is not released.

If the current node is the PML, a protection path delay calculating section 70 calculates the delay from the ingress node to the egress node by using the delay information contained in the protection path setup signaling message and the information indicating the delay from the current node to the egress node.

A route determining section 72 contained in the routing control unit 56 calculates the optimum route to the specified destination that satisfies the requested conditions. The route determining section 72 further includes the following function.

(a) Bypassing a failed node

When performing route calculation for a protection path, determines the optimum protection path route bypassing a node assumed to have failed. First, an optimum PML is determined, and the route calculation is performed by setting the PML as the destination, but if no route is found, the calculation is performed once again by shifting the PML toward the egress side.

Next, the operation of the various parts in FIG. 19 will be described in relation to the path setup procedures explained with reference to FIGS. 1 to 11.

At the ingress node A, the command interface unit 52 accepts a command from maintenance personnel and passes it to the request readout/result notification section 57. The request readout/result notification section 57 reads the command and, if it is recognized as a working/protection path setup request, notifies it to the protection path setup/release control section 66. The protection path setup/release control section 66 passes the working/protection path setup request to the path setup/release control section 60. The path setup/release control section 60 stores the "protection needed/not-needed" information and, as in the prior art procedure, initiates the calculation of the route to the egress node and the examination of the resources for the working path. First, it requests the route determining section 72 to perform the route calculation. The route determining section 72 calculates the optimum route to the egress node and returns the result to the path setup/release control section 60. Next, the path setup/release control section 60 requests the resource control section 64 to check whether the bandwidth and delay requirements of the working path can be satisfied or not. The resource control section 64 checks the bandwidth and delay of the output port, compares them to see if the bandwidth and delay requirements can be satisfied, and returns the result to the path setup/release control section 60. If the above check proves OK, a request is made to the signaling control section 58 to send out a working path setup request message. The signaling control section 58 not only creates the working path setup request message as in the prior art, but in the present invention, also sets information indicating "protection needed" in the path setup request message and passes the message to the signal interface unit 48. The signal interface unit 48 transmits the path setup request message toward the node B.

The signal interface unit 48 at the node B receives the path setup request message from the node A, and passes it to the signaling control section 58. The signaling control section 58 notifies the protection path setup/release control section 66 of the receipt of the working path setup request message. The protection path setup/release control section 66 passes the working path setup request to the path setup/release control section 60. The path setup/release control section 60 stores the "protection needed/not-needed" information, and checks to see whether the bandwidth and delay requirements can be satisfied, as is done at the node A; if the above check proves OK, a request is made to the signaling control section 58 to send out a working path setup request message to the node C. The signaling control section 58 creates the working path setup request message and passes it to the signal interface unit 48. The signal interface unit 48 transmits the path setup request message toward the node C. By performing the above processing at each subsequent node along the working path to be established, the working path setup request message finally arrives at the egress node.

The signal interface unit 48 at the egress node E receives the path setup request message from the node D, and passes it to the signaling control section 58. The signaling control section 58 notifies the protection path setup/release control section 66 of the receipt of the working path setup request message. The protection path setup/release control section 66 passes the working path setup request to the path setup/release control section 60. The path setup/release control section 60 stores the "protection needed/not-needed" information, and notifies the resource control section 64 in order to secure resources for the working path, as is done in the prior art. The resource control section 64 checks the bandwidth of the output port and, if it is OK, secures the bandwidth and notifies the path setup/release control section 60 accordingly. Next, the path setup/release control section 60 notifies the label control section 62 in order to assign a label in accordance with the prior art. The label control section 62 assigns a label to the output port, sets up switch information in the switch unit 50, and reports the result of the label assignment to the path setup/release control section 60. The path setup/release control section 60 notifies the protection path setup/release control section 66 of the completion of the working path setup, while at the same time, notifying the signaling control section 58 to transmit a working path setup response message to the node D. The signaling control section 58 not only creates the working path setup response message as in the prior art, but in the present invention, also appends its own node information to the path setup response message. This processing is performed at each node along the route of the working path, and the node information is used to recognize the intermediate nodes located between that node and the egress node. After that, the signaling control section 58 requests the signal interface unit 48 to send out the path setup response message. The signal interface unit 48 transmits the path setup response message toward the node D. On the other hand, in the case of "protection needed", the protection path setup/release control section 66 requests the signaling control section 58 to send out a protection result notification (setup OK). The signaling control section 58 creates the protection result notification, and passes it to the signal interface unit 48. The signal interface unit 48 transmits the protection result notification toward the node D.

In a large-scale network whose topology cannot be recognized globally, if the relaying node information is appended to the path setup response message being returned from the egress node, as described above, it becomes possible to set up a protection path using a node on the working path whose topology is not visible from the current node.

The signal interface unit 48 at the node D receives the path setup response message and the protection result notification from the node E, and passes them to the signaling control section 58. The signaling control section 58 passes the path setup response message and the protection result notification to the protection path setup/release control section 66. The protection path setup/release control section 66 notifies the path setup/release control section 60 of the receipt of the path setup response message, and stores the protection result notification. To secure resources for the working path in accordance with the prior art, the path setup/release control section 60 activates the resource control section 64. The resource control section 64 checks the bandwidth of the output port and, if it checks OK, secures the bandwidth and notifies the path setup/release control section 60 accordingly. Next, the path setup/release control section 60 notifies the label control section 62 in order to assign a label in accordance with the prior art. The label control section 62 assigns a label to the output port, sets up the assigned label in the switch unit 50, and reports the result of the label assignment to the path setup/release control section 60. The path setup/release control section 60 then notifies the protection path setup/release control section 66 of the completion of the working path setup, while at the same time, notifying the signaling control section 58 to transmit a working path setup response message to the node C. The signaling control section 58 not only creates the working path setup response message as in the prior art, but in the present invention, also appends its own node information to the path setup response message to explicitly indicate the identification of the relaying node and passes the message to the signal interface unit 48. The signal interface unit 48 transmits the path setup response message toward the node C. On the other hand, the protection path setup/release control section 66 that received the working path setup completion notification from the path setup/release control section 60 checks the "protection needed/not-needed" information and, in the case of "protection needed", sends a protection path setup request to the path setup/release control section 60. The path setup/release control section 60 requests the route determining section 72 to determine the route of the protection path. The route determining section 72 determines the optimum route to the PML by excluding any node or link to be bypassed, and reports the result to the path setup/release control section 60. Next, the path setup/release control section 60 activates the resource control section 64 to check the resources for the protection path. The resource control section 64 first activates the bandwidth share judging section 68 and requests it to check if bandwidth sharing is possible or not at the output port. The bandwidth share judging section 68, based on bandwidth share information, checks if the bandwidth can be shared with the already established protection path, and returns the result to the resource control section 64. If it is determined that the bandwidth needs to be increased as a result of the bandwidth share check, the resource control section 64 checks to see if bandwidth can be assigned to that port, and reports the result to the path setup/release control section 60. When it is determined that the requested protection path can be set up, the path setup/release control section 60 requests the signaling control section 58 to send out a protection path setup request message. The signaling control section 58 not only creates the path setup request message as in the prior art, but also sets therein the bandwidth share information and delay information indicating the delay from the ingress and passes the message to the signal interface unit 48. The signal interface unit 48 transmits the path setup request message toward the node J. By performing the same processing at each node along the protection path route, the protection path setup request message finally arrives at the node E, i.e., the PML.

In this way, the optimum route of the protection path bypassing a failure can be determined.

The signal interface unit 48 at the PML node E receives the protection path setup request message from the PSL, and passes it to the signaling control section 58. The signaling control section 58 notifies the protection path setup/release control section 66 of the receipt of the protection path setup request message. The protection path setup/release control section 66 passes the protection path setup request to the path setup/release control section 60. To secure resources for the protection path, the path setup/release control section 60 notifies the resource control section 64 accordingly. The resource control section 64 activates the protection path delay calculating section 70 to check whether the delay requirement is satisfied or not. The protection path delay calculating section 70 calculates the end-to-end delay and reports the result to the resource control section 64. The resource control section 64 compares the end-to-end delay with the delay requirement to check if the requirement is satisfied or not. The resource control section 64 reports the result of the check to the path setup/release control section 60. If the result of the check is OK, the path setup/release control section 60 performs label assignment in accordance with the prior art. The label assignment procedure is the same as that for the working path and, therefore, the description will not be repeated here. Next, the path setup/release control section 60 notifies the protection path setup/release control section 66 of the completion of the protection path setup, while at the same time, notifying the signaling control section 58 to transmit a protection path setup response message to the node J. The operation of the signaling control section 58 thereafter is the same as that performed in the prior art, and therefore, will not be described here.

In this way, the end-to-end delay can be checked at the PML, and the delay requirement can be satisfied even when the protection path is used.

The processing performed at the node J is the same as that for the working path setup, except the processing for bandwidth sharing. The processing for bandwidth sharing will not be described here, but will be described below with reference to the processing performed at the PSL node D.

The signal interface unit 48 at the PSL node D receives the protection path setup response message, and passes it to the signaling control section 58. The signaling control section 58 notifies the protection path setup/release control section 66 of the receipt of the protection path setup response message. The protection path setup/release control section 66 notifies the path setup/release control section 60 of the receipt of the protection path setup response message. To secure resources for the protection path, the path setup/release control section 60 notifies the resource control section 64 accordingly. The resource control section 64 activates the bandwidth share judging section 68 and requests it to check bandwidth sharing at the output port. The bandwidth share judging section 68 checks the bandwidth sharing based on path information and, if the bandwidth can be shared, allows the bandwidth sharing and returns the result to the resource control section 64. If the bandwidth needs to be increased as a result of the bandwidth sharing, the resource control section 64 checks to see if the bandwidth can be assigned to that port and, if the check proves OK, secures the bandwidth and reports the result to the path setup/release control section 60. The path setup/release control section 60 notifies the protection path setup/release control section 66 of the completion of the protection path setup. When the protection path setup is completed, and when the protection result notification received from the egress side indicates OK, then the protection path setup/release control section 66 requests the signaling control section 58 to send out a protection result notification (setup OK) to notify the upstream node C. The signaling control section 58 creates the protection result notification, and passes it to the signal interface unit 48. The signal interface unit 48 transmits the protection result notification toward the node C. By performing the above processing at each node along the working path route, the protection path setup is completed, and the protection result notification for all the protection paths finally arrives at the ingress node.

At the ingress node A also, the protection path setup is performed, as is done at other nodes, but the procedure is the same as that described above and will not be described here. The signal interface unit 48 at the node A receives the protection result notification from the node B, and passes it to the signaling control section 58. The signaling control section 58 passes the protection result notification to the protection path setup/release control section 66. When the protection path setup is completed, and when the protection result notification indicates OK, then the protection path setup/release control section 66 notifies the request readout/result notification section 57 of the completion of the working/protection path setup. The request readout/result notification section 57 edits the result and notifies the command interface unit 52. The command interface unit 52 reports the execution result of the command to the maintenance personnel.

In this way, the working path setup and the protection path setup can be performed in a synchronized fashion. Furthermore, by appending the information necessary for bandwidth sharing to the path setup request message during the protection path setup, bandwidth sharing becomes possible.

Now, taking as an example the case shown in FIG. 20 where nodes A to C and F to H belong to an area 80, and nodes C to E and H to J to an area 82, and where the nodes C and H are ABRs (Area Border Routers), a description will be given of the operation performed when setting up a protection path bypassing the ABR node C.

Figure 20:
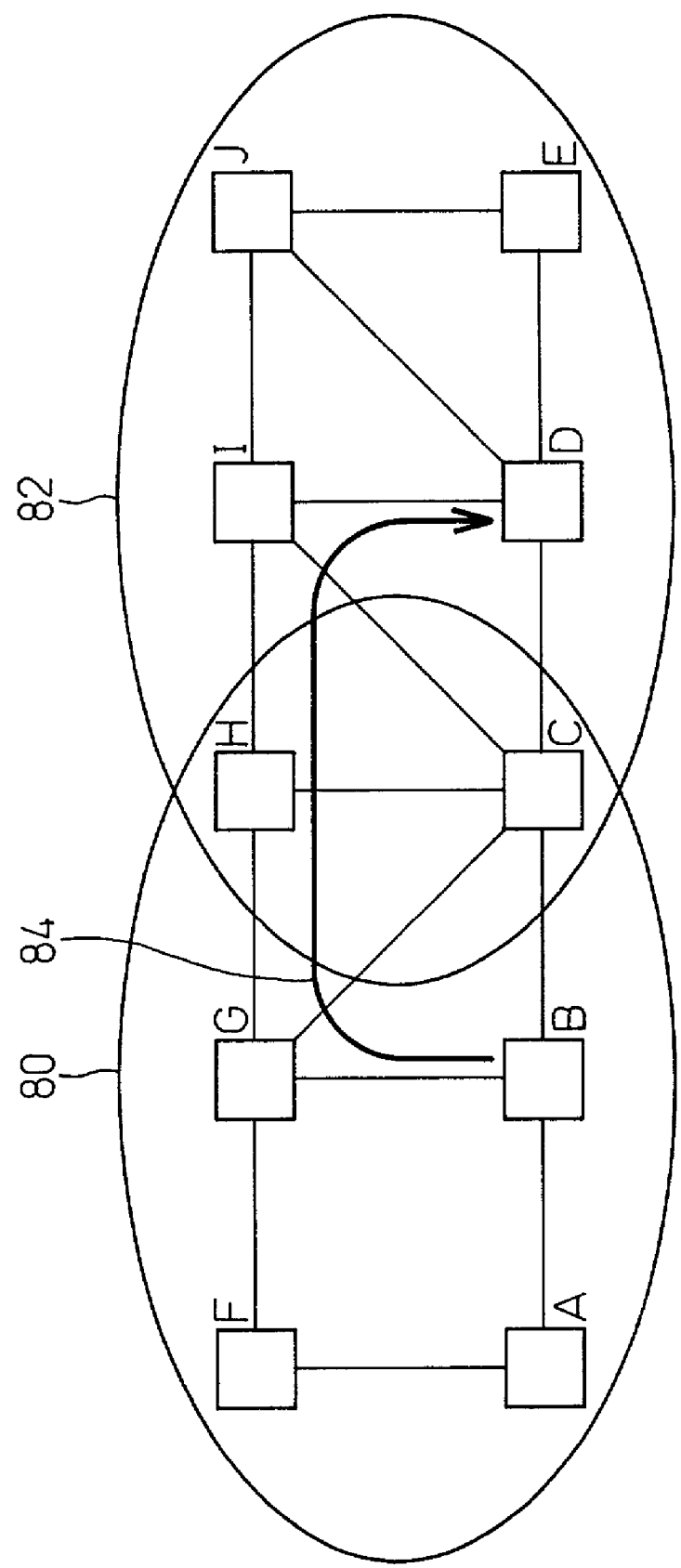
FIG. 20 is a diagram showing a protection path that crosses an area border.

In FIG. 20, when setting up a working path from the node A as the ingress node to the node E as the egress node, each node along the route initiates the protection path setup procedure triggered by the receipt of the working path setup response message. The protection path setup procedure will be described below by taking the node B as an example.

The signal interface unit 48 at the node B passes the working path setup response message, received from the node C, to the signaling control section 58. The signaling control section 58 passes the path setup response message to the protection path setup/release control section 66. The protection path setup/release control section 66 notifies the path setup/release control section 60 of the receipt of the path setup response message. The path setup/release control section 60 issues instructions for resource reservation and label assignment for the working path in accordance with the prior art. The resource reservation and label assignment procedures are the same as previously described, and will not be described here. Next, the path setup/release control section 60 notifies the protection path setup/release control section 66 of the completion of the working path setup, while at the same time, notifying the signaling control section 58 to transmit the working path setup response message to the ingress node. The processing performed by the signaling control section 58 is the same as previously described, and will not be described here. The protection path setup/release control section 66 that received the working path setup completion notification from the path setup/release control section 60 checks the "protection needed/not-needed" information and, in the case of "protection needed", sends a protection path setup request to the path setup/release control section 60. The path setup/release control section 60 issues instructions for route determination and a resource check for the protection path. The protection path route determination and resource check procedures are the same as previously described, and will not be described here. When it is determined that the requested protection path can be set up, the path setup/release control section 60 requests the signaling control section 58 to send out a protection path setup request message. The signaling control section 58 not only creates the path setup request message as in the prior art, but also sets therein the bandwidth share information, delay information indicating the delay from the ingress node, and information indicating the ABR to be bypassed, and passes the message to the signal interface unit 48. The signal interface unit 48 transmits the path setup request signaling 84 toward the node G.

The destination of the path setup request signaling 84 is the node D, but the node D is in a different area than the node B. In this case, since the node B does not know the topology outside its own area, the ABR node H located at the area border determines the route to the node D. The processing performed at the ABR node H will be described below.

The signal interface unit 48 at the node H receives the protection path setup request message 84 transmitted via the node G from the PSL node B, and passes it to the signaling control section 58. The signaling control section 58 notifies the protection path setup/release control section 66 of the receipt of the protection path setup request message. The protection path setup/release control section 66 passes the protection path setup request to the path setup/release control section 60. The path setup/release control section 60 requests the route determining section 72 to determine the route for the protection path. The route determining section 72 determines the optimum route to the PML (node D) by excluding the bypassed node (node C) reported from the node B, and reports the result to the path setup/release control section 60. Next, the path setup/release control section 60 activates the resource control section 64 to check the resources for the protection path. The processing performed by the resource control section 64 has previously been described, and the description will not be repeated here. When it is determined that the requested protection path can be set up, the path setup/release control section 60 requests the signaling control section 58 to send out the protection path setup request message. The processing performed by the signaling control section 58 has also been described previously, and the description will not be repeated here. By performing the above process, the protection path setup request message finally arrives at the PML.

In this way, in a large-scale network, a protection path that does not overlap with the working path can be set up across an area border.

Next, the operation of the various parts in FIG. 19 will be described in relation to the working/protection path release procedures explained with reference to FIGS. 12 to 18.

At the ingress node A, the command interface unit 52 accepts a command from maintenance personnel and passes it to the request readout/result notification section 57. The request readout/result notification section 57 reads the command and, if it is recognized as a working/protection path release request, notifies it to the protection path setup/release control section 66. The protection path setup/release control section 66 passes the working path setup request without protection to the path setup/release control section 60. The path setup/release control section 60 recognizes that the working path already exists, and requests the signaling control section 58 to send out a working path setup request message without protection. The signaling control section 58 not only creates the working path setup request message as in the prior art, but in the present invention, also sets "protection not-needed" information in the path setup request message and passes the message to the signal interface unit 48. The signal interface unit 48 transmits the path setup request message toward the node B.

The signal interface unit 48 at the node B receives the path setup request message from the node A, and passes it to the signaling control section 58. The signaling control section 58 notifies the protection path setup/release control section 66 of the receipt of the working path setup request message. The protection path setup/release control section 66 passes the working path setup request to the path setup/release control section 60. The path setup/release control section 60 recognizes that the working path already exists, and requests the signaling control section 58 to send out a working path setup request message without protection to the node C. The signaling control section 58 creates the working path setup request message and passes it to the signal interface unit 48. The signal interface unit 48 transmits the path setup request message toward the node C. By performing the above processing at each subsequent node along the route of the working path, the working path setup request message without protection finally arrives at the egress node.

The signal interface unit 48 at the egress node receives the path setup request message from the node D, and passes it to the signaling control section 58. The signaling control section 58 notifies the protection path setup/release control section 66 of the receipt of the working path setup request message. The protection path setup/release control section 66 passes the working path setup request to the path setup/release control section 60. The path setup/release control section 60 recognizes that the working path already exists, and notifies the protection path setup/release control section 66 of the completion of the protection path release, while at the same time, notifying the signaling control section 58 to transmit a working path setup response message to the node D. The signaling control section 58 creates the working path setup response message, and passes it to the signal interface unit 48. The signal interface unit 48 transmits the path setup response message toward the node D. On the other hand, the protection path setup/release control section 66 recognizes that the protection is no longer needed, and requests the signaling control section 58 to send out a protection result notification (release OK). The signaling control section 58 creates the protection result notification, and passes it to the signal interface unit 48. The signal interface unit 48 transmits the protection result notification toward the node D.

The signal interface unit 48 at the node D receives the path setup response message and the protection result notification (release OK) from the egress node, and passes them to the signaling control section 58. The signaling control section 58 passes the path setup response message and the protection result notification (release OK) to the protection path setup/release control section 66. The protection path setup/release control section 66 notifies the path setup/release control section 60 of the receipt of the path setup response message, and stores the protection result notification (release OK). The path setup/release control section 60 recognizes that the working path already exists, and notifies the protection path setup/release control section 66 of the completion of the working path setup while, at the same time, notifying the signaling control section 58 to transmit a working path setup response message to the node C. The signaling control section 58 creates the working path setup response message, and passes it to the signal interface unit 48. The signal interface unit 48 transmits the path setup response message toward the node C. On the other hand, the protection path setup/release control section 66 that received the working path setup completion notification from the path setup/release control section 60 recognizes that the protection is no longer needed, and requests the signaling control section 58 to send out protection path release request signaling. The signaling control section 58 creates the path release request signaling, and passes it to the signal interface unit 48. The signal interface unit 48 transmits the path release request signaling toward the node J. By performing the same processing at each node along the protection path to be released, the protection path release request signaling finally arrives at the PML (node D).

The signal interface unit 48 at the PML receives the protection path release request signaling from the PSL (node D), and passes it to the signaling control section 58. The signaling control section 58 notifies the protection path setup/release control section 66 of the receipt of the protection path release request signaling. The protection path setup/release control section 66 passes the protection path release request to the path setup/release control section 60. The path setup/release control section 60 notifies the label control section 62 to release the protection path label. The label control section 62 clears the switch information in the switch unit 50, releases the label assigned to the output port, and notifies the path setup/release control section 60 accordingly. Next, the path setup/release control section 60 notifies the protection path setup/release control section 66 of the completion of the protection path release, while at the same time, notifying the signaling control section 58 to transmit protection path release response signaling to the node J. The signaling control section 58 creates the protection path release response signaling, and passes it to the signal interface unit 48. The signal interface unit 48 transmits the path release response signaling toward the node J.

The processing performed at the node J is the same as the above-described release procedure, except the bandwidth share release operation. The bandwidth share release operation will not be described here, but will be described below with reference to the processing performed at the PSL node D.

The signal interface unit 48 at the PSL node D receives the protection path release response signaling, and passes it to the signaling control section 58. The signaling control section 58 notifies the protection path setup/release control section 66 of the receipt of the protection path release response signaling. The protection path setup/release control section 66 notifies the path setup/release control section 60 of the receipt of the protection path release response signaling. The path setup/release control section 60 notifies the resource control section 64 to release the resources reserved for the protection path. The resource control section 64 requests the bandwidth share judging section 68 to release the bandwidth share. The bandwidth share judging section 68 notifies the resource control section 64 after releasing the bandwidth share. If there is a need to release the bandwidth of the output port as a result of releasing the bandwidth share, the resource control section 64 releases the bandwidth and notifies the path setup/release control section 60 accordingly. The path setup/release control section 60 notifies the protection path setup/release control section 66 of the completion of the protection path release. When the protection path release is completed, and when the protection result notification received from the egress side indicates OK, then the protection path setup/release control section 66 requests the signaling control section 58 to send out a protection result notification (release OK) to notify the upstream node C. The signaling control section 58 creates the protection result notification (release OK), and passes it to the signal interface unit 48. The signal interface unit 48 transmits the protection result notification (release OK) toward the node C. By performing the above processing at each node along the route of the working path, the protection path release is completed, and the protection result notification (release OK) for all the protection paths finally arrives at the ingress node.

At the ingress node (node A) also, the protection path release is performed, as is done at other nodes, but the procedure is the same as that described above and will not be described here. The signal interface unit 48 at the node A receives the protection result notification (release OK) from the node B, and passes it to the signaling control section 58. The signaling control section 58 passes the protection result notification (release OK) to the protection path setup/release control section 66. The protection path setup/release control section 66 recognizes that all the protection paths have been released, and requests the path setup/release control section 60 to release the working path. The path setup/release control section 60 recognizes the working path release request, and requests the signaling control section 58 to send out working path release request signaling. The signaling control section 58 creates the working path release request signaling, and passes it to the signal interface unit 48. The signal interface unit 48 transmits the path release request signaling toward the node B.

The signal interface unit 48 at the node B receives the path release request signaling from the node A, and passes it to the signaling control section 58. The signaling control section 58 notifies the protection path setup/release control section 66 of the receipt of the working path release request signaling. The protection path setup/release control section 66 passes the working path release request to the path setup/release control section 60. The path setup/release control section 60 recognizes the working path release, and requests the signaling control section 58 to send out working path release request signaling to the node C. The signaling control section 58 creates the working path release request signaling, and passes it to the signal interface unit 48. The signal interface unit 48 transmits the path release request signaling toward the node C. By performing the above processing at each node along the working path to be released, the working path release request signaling finally arrives at the egress node.

The signal interface unit 48 at the egress node (node E) receives the path release request signaling from the node D, and passes it to the signaling control section 58. The signaling control section 58 notifies the protection path setup/release control section 66 of the receipt of the working path release request signaling. The protection path setup/release control section 66 passes the working path release request to the path setup/release control section 60. The path setup/release control section 60 notifies the resource control section 64 to release the resources reserved for the working path, as in the prior art. The resource control section 64 releases the bandwidth of the output port, and notifies the path setup/release control section 60 accordingly. Next, the path setup/release control section 60 notifies the label control section 62 to release the path label in accordance with the prior art. The label control section 62 clears the switch information in the switch unit 50, releases the label assigned to the output port, and notifies the path setup/release control section 60 accordingly. The path setup/release control section 60 notifies the protection path setup/release control section 66 of the completion of the working path release, while at the same time, notifying the signaling control section 58 to transmit working path release response signaling to the node D. The signaling control section 58 creates the working path release response signaling, and passes it to the signal interface unit 48. The signal interface unit 48 transmits the path release response signaling toward the node D.

The signal interface unit 48 at the node D passes the received path release response signaling to the signaling control section 58. The signaling control section 58 notifies the protection path setup/release control section 66 of the receipt of the working path release response signaling. The protection path setup/release control section 66 passes the working path release request to the path setup/release control section 60. The path setup/release control section 60 issues working path resource release and label release instructions as in the prior art. The resource release and label release procedures are the same as previously described, and will not be described here. The path setup/release control section 60 notifies the protection path setup/release control section 66 of the completion of the working path release, while at the same time, notifying the signaling control section 58 to transmit working path release response signaling to the node C. The signaling control section 58 creates the working path release response signaling, and passes it to the signal interface unit 48. The signal interface unit 48 transmits the path release response signaling toward the node C.

By performing the above processing at each node along the working path to be released, the working path release response signaling finally arrives at the ingress node.

The signal interface unit 48 at the ingress node passes the received path release response signaling to the signaling control section 58. The signaling control section 58 notifies the protection path setup/release control section 66 of the receipt of the working path release response signaling. The protection path setup/release control section 66 passes the working path release request to the path setup/release control section 60. The path setup/release control section 60 issues a working path resource release instruction as in the prior art. The resource release procedure is the same as previously described, and will not be described here. The path setup/release control section 60 notifies the protection path setup/release control section 66 of the completion of the working path release. The protection path setup/release control section 66 notifies the request readout/result notification section 57 of the completion of the working/protection path release. The request readout/result notification section 57 edits the result and notifies the command interface unit 52. The command interface unit 52 reports the execution result of the command to the maintenance personnel.

In this way, the working path release and the protection path release can be performed in a synchronized fashion, with each node autonomously performing the protection path release, and the enormous number of maintenance man-hours that would be required if the path release was done manually, can be reduced drastically.

Figure 21:
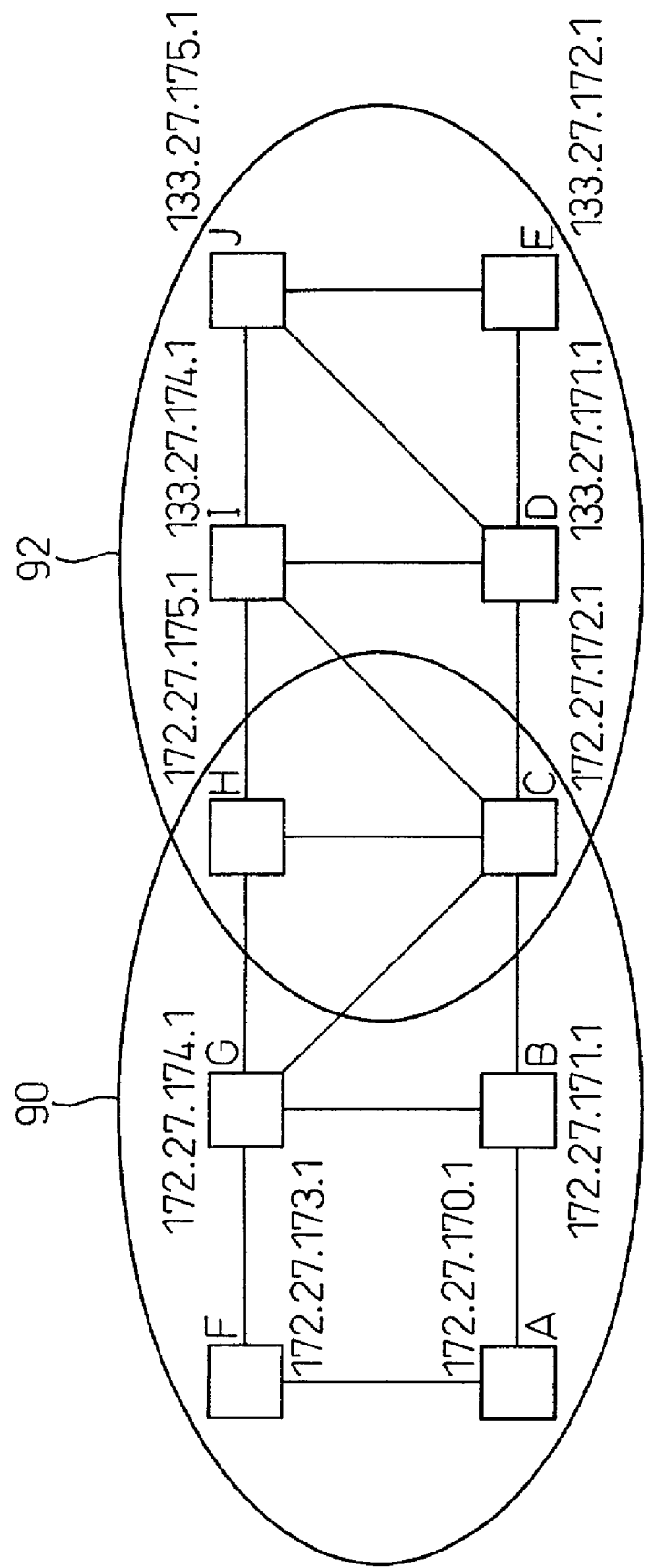
FIG. 21 is a diagram showing one example of a network using OSPF protocol, to which the present invention is applied.

In networks where the present invention is applicable, various routing protocols such as OSPF (Open Shortest Path First), RIP (Routing Information Protocol), BGP4 (Border Gateway Protocol version 4), etc. are commonly used. Among them, a network using, for example, OSPF will be taken as an example and will be described in further detail below. In OSPF, the network usually takes a two-layer topology configuration in which the entire network is divided into areas, each being a collection of a plurality of nodes, and the areas are linked together by a backbone area. Here, a node located at an area border recognizes itself as an area border node (ABR) by virtue of the function of OSPF. For example, in the example of FIG. 21, reference numeral 90 indicates one area, and 92 the backbone area, and nodes C and H are ABRs. As shown, an IP address is assigned as a node ID to each node.

It is also assumed that the illustrated network uses MPLS as a cut-through method for achieving high-speed packet switching. When using MPLS, LSPs (Label Switched Paths) must be set up by distributing labels along the optimum route calculated by OSPF. Various label distribution protocols are proposed, such as RSVP-LSP-Tunnel, CR-LDP, and LDP, and any protocol may be used. The following description is given by taking the case of RSVP-LSP-Tunnel as an example.

Figure 22:
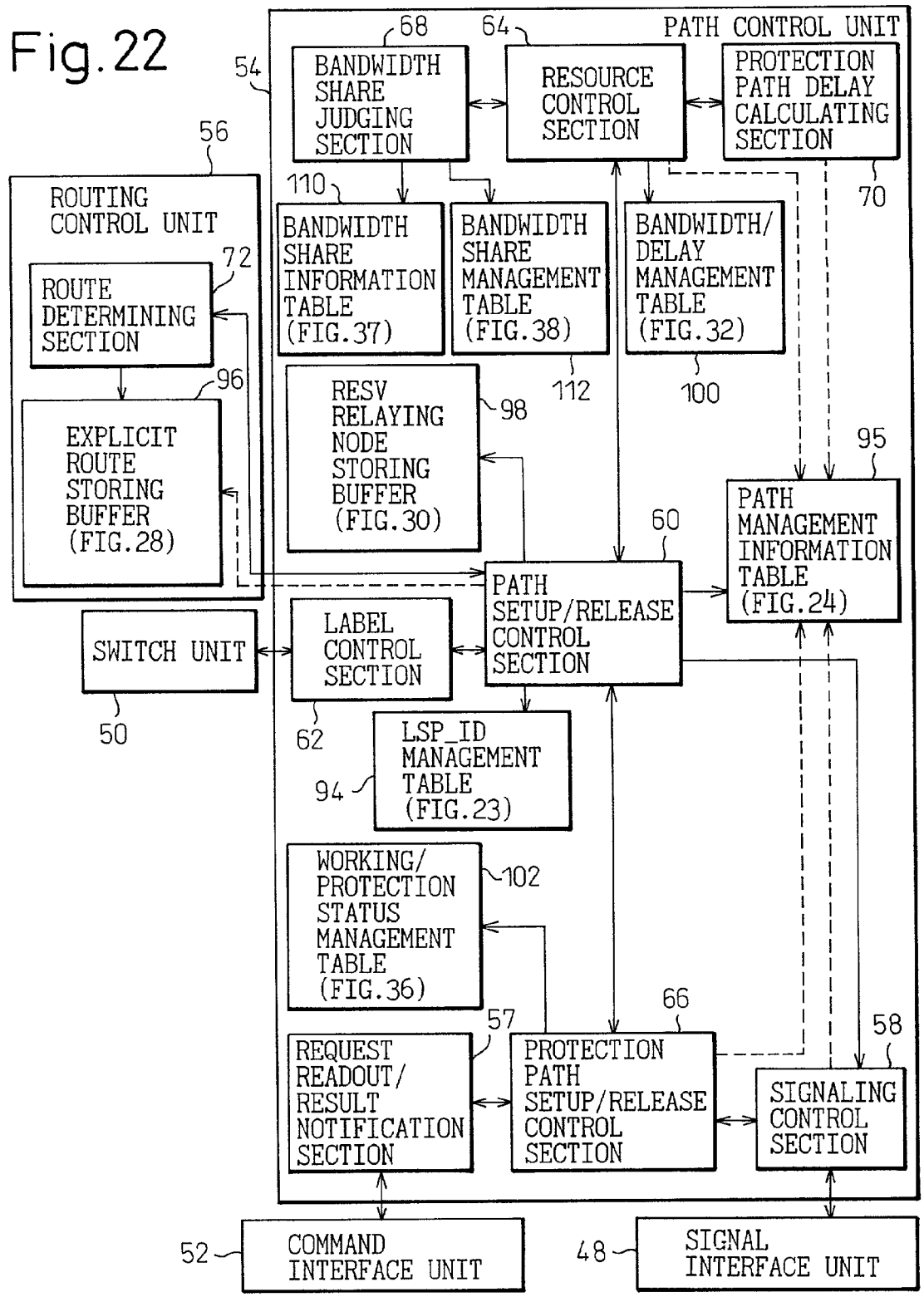
FIG. 22 is a diagram showing a further detailed configuration of the node apparatus according to the present invention.

FIG. 22 shows the configuration of each node apparatus. The component elements corresponding to those shown in FIG. 19 are designated by the same reference numerals. First, referring to FIG. 21, a description will be given of the operation of the node A which accepts a working/protection path setup request from maintenance personnel. In the illustrated example, the maintenance personnel enters a request to establish a path, with a bandwidth requirement of 10 Mbit/s and delay requirement of 100 ms, from the node A (172.27.170.1) to the node E (133.27.172.1).

Figure 23:
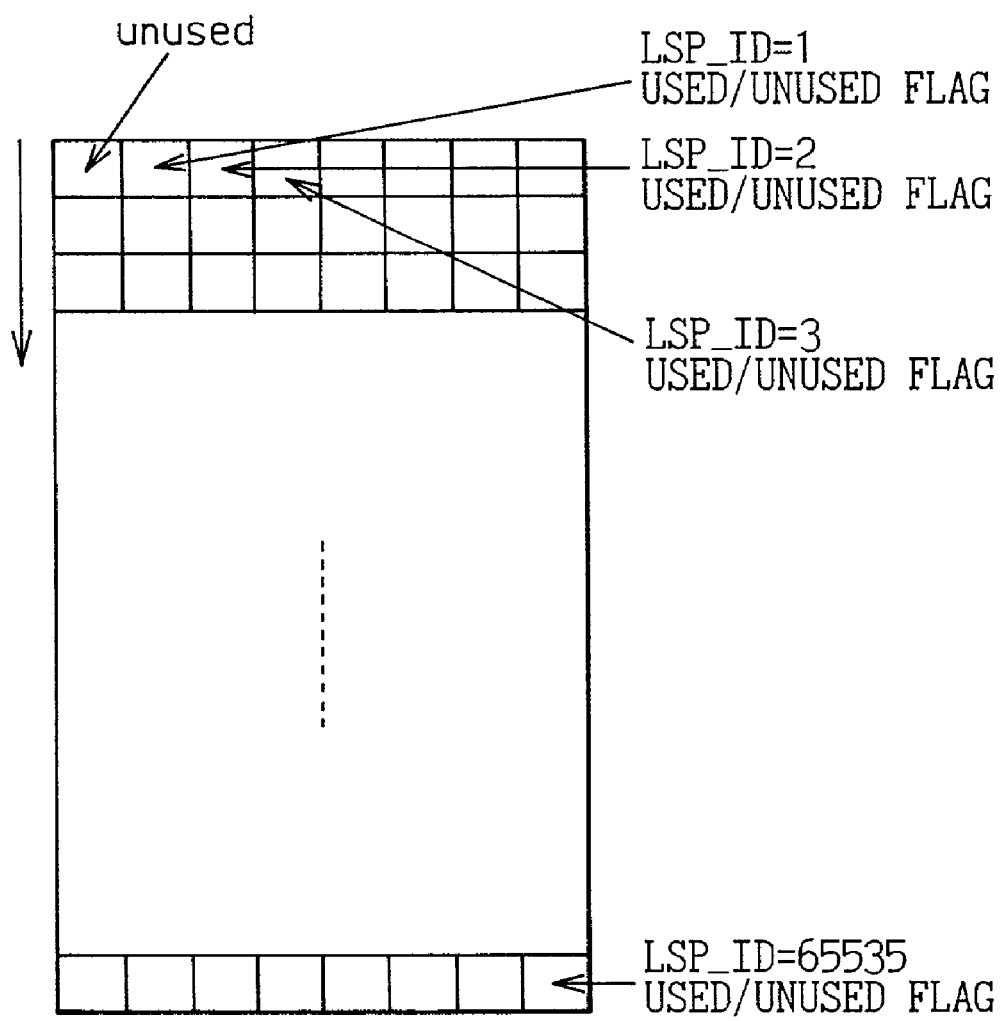
FIG. 23 is a diagram showing an LSP_ID management table.
Figure 24:
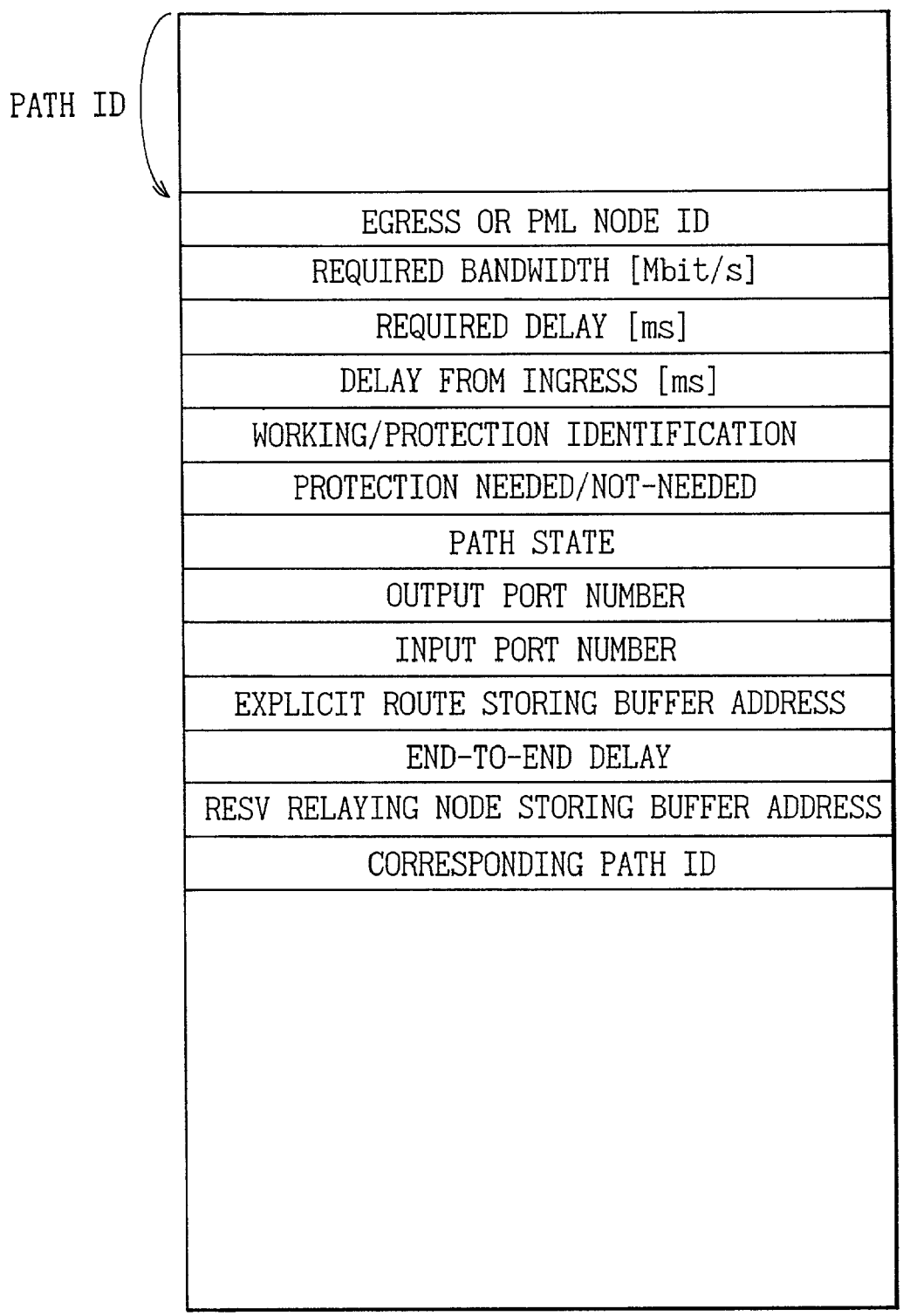
FIG. 24 is a diagram showing a path information management table.
Figure 28:
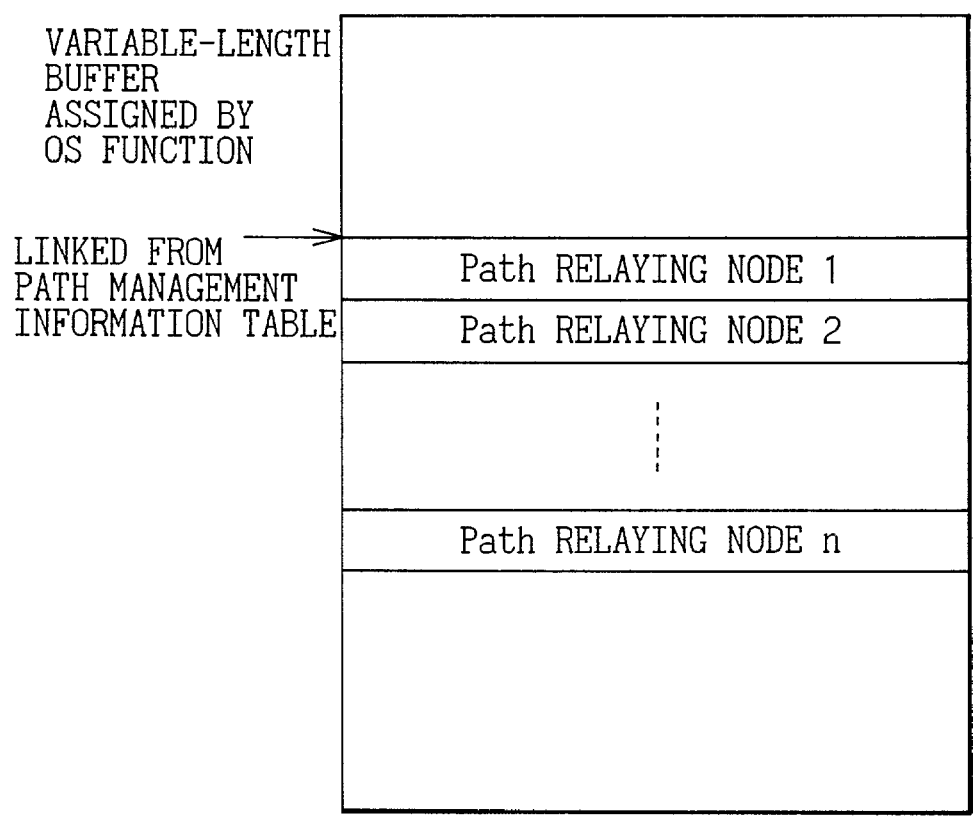
FIG. 28 is a diagram showing an explicit route storing buffer.
Figure 32:
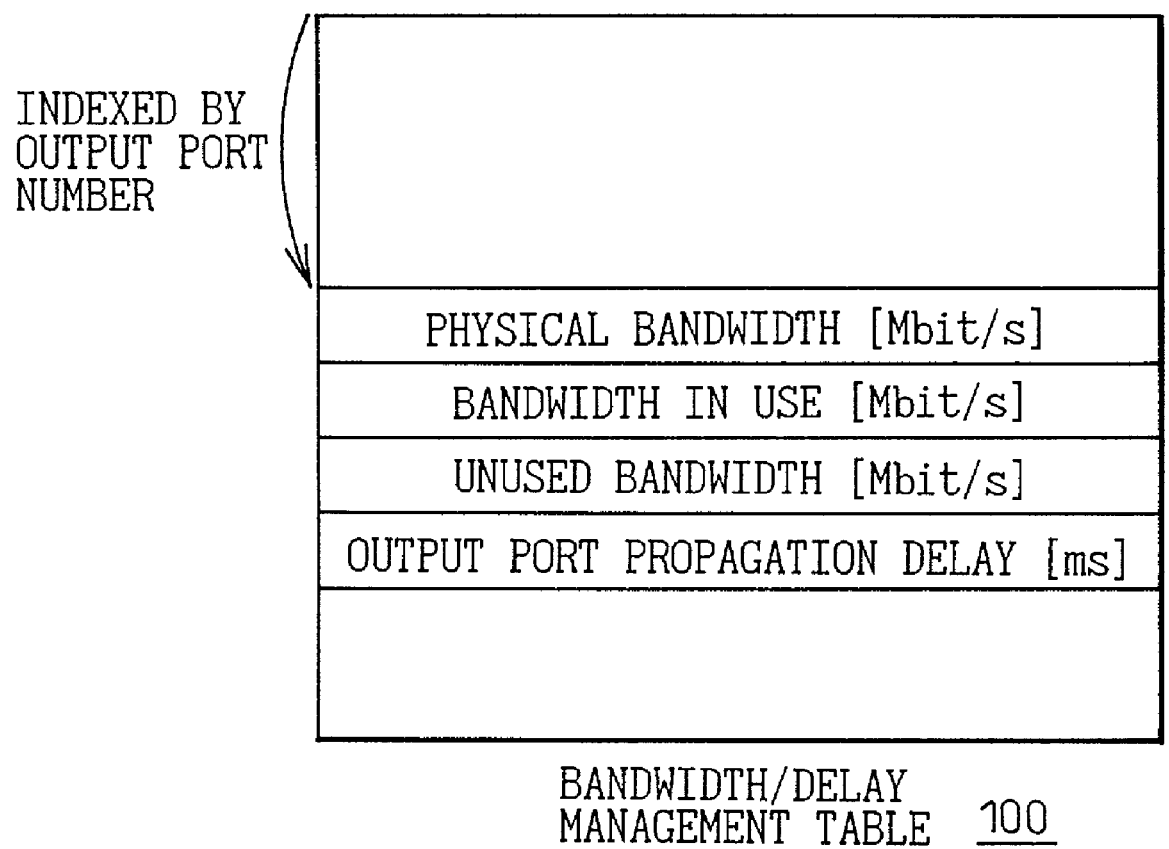
FIG. 32 is a diagram showing a bandwidth/delay management table.

At the node A as the ingress node, the request readout/result notification section 57 receives the path setup request via the command interface unit 52 and passes it to the protection path setup/release control section 66. The protection path setup/release control section 66 passes the received request to the path setup/release control section 60. Upon receiving the request, the path setup/release control section 60 initiates the transmission of a Path message for a working path. For the transmission of the Path message, first an LSP_ID for managing the path is acquired. To acquire the LSP_ID, the LSP_ID management table 94 shown in FIG. 23 is searched to extract an unused LSP_ID. Next, the path management information table 95 shown in FIG. 24 is indexed using the path ID (ingress node ID (172.27.170.1)+ acquired LSP_ID), and the information received from the maintenance personnel is set up as shown in FIG. 25. After setting up the path management information table 95, the path setup/release control section 60 activates the route determining section 72, and requests it to determine the route for the working path. The route determining section 72 determines the route for the working path. The route may be determined in accordance with the Dijkstra algorithm used in OSPF, or a minimum hop route that satisfies the bandwidth and delay requirements may be used. The route determining section 72 returns the result to the path setup/release control section 60 after setting the thus determined route in the explicit route storing buffer shown in FIG. 28. The determined route is set in the explicit route storing buffer as shown in FIG. 29. Here, the route only up to the node C is determined because the nodes beyond that are located outside the area and the topology is not visible. The path setup/release control section 60 next activates the resource control section 64 to check whether the bandwidth and delay satisfy the requirements. The resource control section 64 indexes the bandwidth/delay management table 100 shown in FIG. 32 to check if the bandwidth and delay requirements can be satisfied. It is assumed here that the bandwidth/delay management table is set up as shown in FIG. 33. In this case, since the unused bandwidth is 5240 Mbit/s in comparison with the required bandwidth of 10 Mbit/s, the bandwidth check is OK. The delay requirement check is also OK since the propagation delay is 10 ms in comparison with the delay requirement of 100 ms. If the result of the check is NG, a search is made for another route.

The resource control section 64 returns the result of the check to the path setup/release control section 60. The path setup/release control section 60 requests the signaling control section 58 to send out the Path message. The signaling control section 58 creates the working path Path message by including therein the bandwidth and delay requirements and the value of the delay from the ingress node and by appending "protection needed" information to it, and sends out the thus created Path message. The propagation delay in each node is added up to obtain the delay accumulated from the ingress node, so that the delay accumulated from the ingress node can be recognized at each node. It is assumed here that the delay through each node apparatus is included in the propagation delay. Since the current node is the ingress node, the delay from the ingress node, 10 ms, is set in the Path message together with the bandwidth requirement of 10 Mit/s and the delay requirement of 100 ms.

The Path message thus sent out from the ingress node A finally reaches the egress node E via the nodes B, C, and D in this order, while storing the "protection needed" information at each node on the way.

Figure 36:
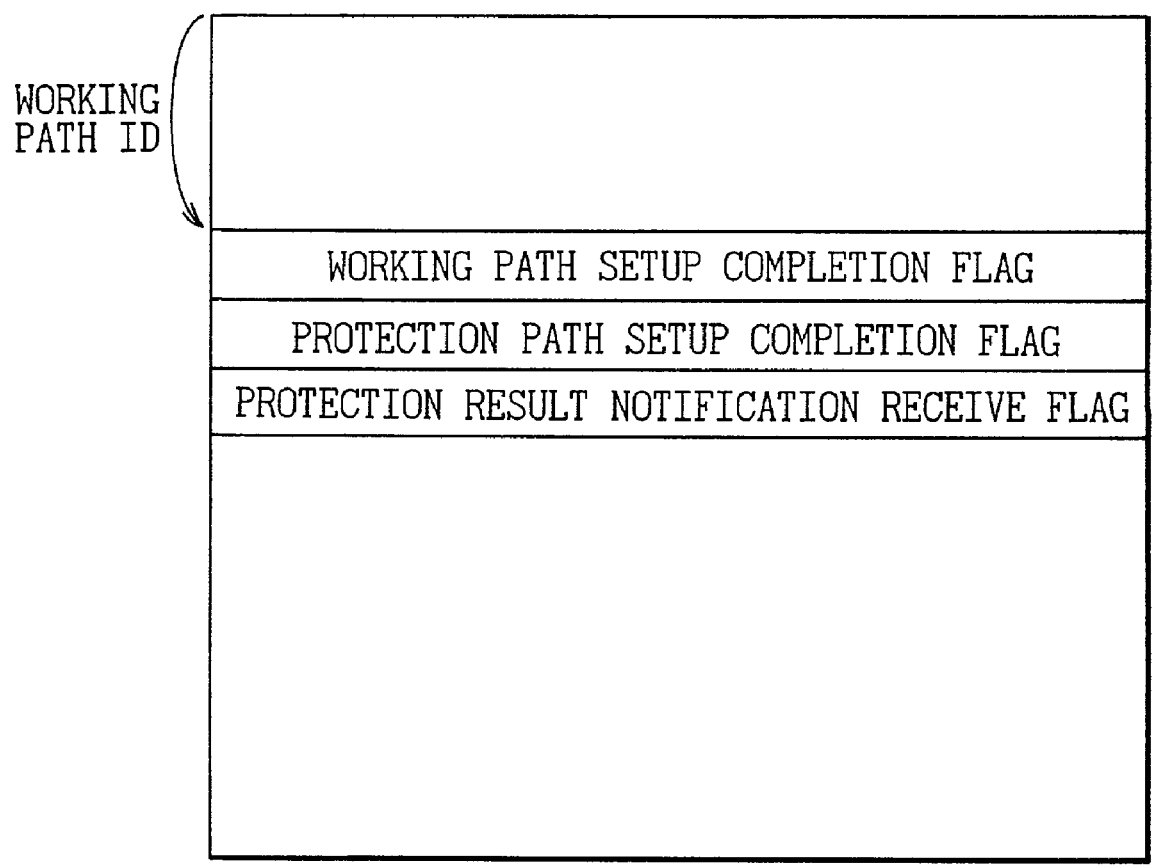
FIG. 36 is a diagram showing a working/protection status management table.

The signaling control section 58 at the egress node E receives the message via the signal interface unit 48, and notifies it to the protection path setup/release control section 66. The protection path setup/release control section 66 notifies the path setup/release control section 60 of the receipt of the Path message. The path setup/release control section 60 processes the received Path message. The procedures for LSP_ID acquisition, path management information table setup, and the activation of the resource control section 64 are the same as those performed at the ingress node, and therefore, will not be described here. After activating the resource control section 64, the path setup/release control section 60 activates the label control section 62 and requests it to assign a label, as the current node is the egress node. The label control section 62 seizes a label and, after setting it up in the switch unit 50, notifies the result to the path setup/release control section 60. Next, the path setup/release control section 60 requests the signaling control section 58 to send out a Resv message, and notifies the protection path setup/release control section 66 of the completion of the working path setup. The signaling control section 58 creates the working path Resv message by appending its own node ID to it, and sends it out. Since the node E is the egress node, the Resv message contains no node IDs other than node E's ID of 133.27.172.1. The end-to-end delay is also included in the Resv message, as in the prior art. The delay included in the Path message is used as the end-to-end delay. In the example of FIG. 9, since the delay on each link is 10 ms, the delay from the ingress node is 40 ms. On the other hand, the protection path setup/release control section 66 that received the working path setup completion notification from the path setup/release control section 60 sets the working path setup completion in the working/protection status management table shown in FIG. 36. Next, as the protection is needed, and the current node is the egress node, a request is made to the signaling control section 58 to send out a protection result notification. The signaling control section 58 creates the protection result notification and sends it out.

The Resv message sent out from the egress node E reaches the ingress node A via the nodes D, C, and B in this order, with the respective node IDs appended to it on the way. In this way, the path information returned from the egress node can be obtained, even in a large-scale network in which global topology information is not available.

Figure 30:
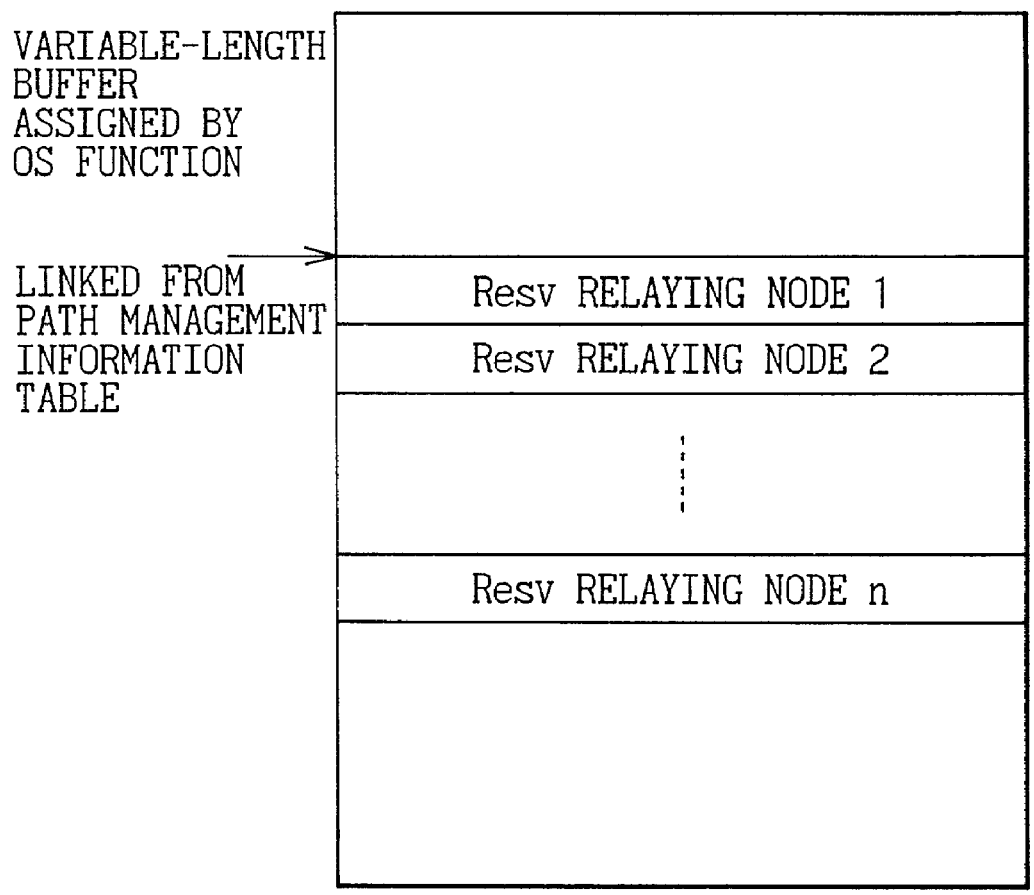
FIG. 30 is a diagram showing a Resv relaying node storing buffer.

Next, a description will be given of how the protection path setup procedure is initiated by being triggered by the receipt of the working path Resv message. Every node from the node D to the ingress node A performs the protection path setup procedure, but the following description is given by taking the node B as an example. It is assumed that the path management information table in the node B is set up as shown in FIG. 26 when the Path message is received. The signaling control section 58 at the node B receives the Resv message via the signal interface unit 48, and notifies it to the protection path setup/release control section 66. The protection path setup/release control section 66 notifies the path setup/release control section 60 of the receipt of the Resv message. The path setup/release control section 60 initiates the processing for the received working path Resv message. In the Resv message processing procedure, first a request is made to the resource control section 64 to secure the resources for the working path. The resource control section 64 indexes the bandwidth/delay management table 100 of FIG. 32 to check if the bandwidth requirement can be satisfied. This check was already done when the Path message was received, but since there is a possibility of contention, the check is done once again when the Resv message is received. It is assumed that the bandwidth/delay management table 100 in the node B is set up as shown in FIG. 34. In this case, since the unused bandwidth is 9240 Mbit/s in comparison with the required bandwidth of 10 Mbit/s, the bandwidth check is OK. When the check is OK, the bandwidth/delay management table 100 is updated. The required bandwidth of 10 Mbit/s is added to the currently used bandwidth of 1000 Mbit/s to increase it to 1010 Mbit/s, while the required bandwidth of 10 Mbit/s is subtracted from the unused bandwidth of 9240 Mbit/s to reduce it to 9230 Mbit/s. The result is then reported to the path setup/release control section 60. The path setup/release control section 60 activates the label control section 62 to perform label assignment. The operation performed by the label control section 62 has already been described, and the description will not be repeated here. The path setup/release control section 60 requests the signaling control section 58 to send out the Resv message to the upstream node. The operation performed by the signaling control section 58 has already been described, and the description will not be repeated here. The path setup/release control section 60 stores the relaying node information from the egress, contained in the Resv message, into the Resv relaying node storing buffer 98 shown in FIG. 30, and links it to the path management information table 95 shown in FIG. 24. The relaying node information set up in the Resv relaying node storing buffer 98 is as shown in FIG. 31. The path setup/release control section 60 enters the end-to-end delay value, carried in the Resv message, into the pass management information table 95 and sets the path state in the table to "communicating". Finally, it notifies the protection path setup/release control section 66 of the completion of the working path setup. When the working path completion notification is received, the protection path setup/release control section 66 sets the working path setup completion in the working/protection status management table 102 shown in FIG. 36. Next, the protection needed state is recognized, and a protection path setup request is issued to the path setup/release control section 60. Upon receiving the protection path setup request from the protection path setup/release control section 66, the path setup/release control section 60 initiates the transmission of a Path message for the protection path. First, the LSP_ID management table 94 of FIG. 23 and the path management information table 95 of FIG. 24 are set up. The table setup procedure has already been described, and the description will not be repeated here. The contents set up in the path management information table 95 are as shown in FIG. 27. Next, the path setup/release control section 60 activates the route determining section 72 to determine the route for the protection path. The route determining section 72 first extracts the bypassed node and the PML from the Resv relaying node storing buffer 98 shown in FIG. 30. At the node B, since the table is set up as shown in FIG. 31, the bypassed node is the node C shown at the top, and the PML candidate is the node D shown directly below it. The route determining section 72 determines the optimum route to the node D by bypassing the node C in accordance with the prior art. If the route cannot be determined, the PML is shifted by one node toward the egress node and the route calculation is performed once again. In this way, the optimum route to the PML is determined. The result of the calculation shows that the protection path from the node B takes the route passing through the nodes G and H. The route thus determined is stored in the explicit route storing buffer 96 shown in FIG. 28. The method of storing has already been described previously, and the description of it will not be repeated here. After determining the route, the route determining section 72 notifies it to the path setup/release control section 60. The path setup/release control section 60 activates the resource control section 64. The resource control section 64 indexes the bandwidth/delay management table 100 of FIG. 32 to check if the delay requirement is satisfied or not. The delay from the ingress node is 10 ms as shown in FIG. 27, and the delay of the output port is 10 ms as shown in FIG. 35; therefore, the total delay is 20 ms, which satisfies the delay requirement of 100 ms, and thus the check is OK. Next, the resource control section 64 activates the bandwidth share judging section 68 to determine whether bandwidth sharing is possible or not. The operation of the bandwidth share judging section 68 will be described later. If the result of the bandwidth share check shows that bandwidth sharing is not possible, or that bandwidth sharing is possible but the bandwidth to be shared needs to be increased, the resource control section 64 checks to see if the required bandwidth is available from the unused bandwidth, and reports the result to the path setup/release control section 60. The bandwidth check procedure has already been described, and the description of it will not be repeated here. The path setup/release control section 60 requests the signaling control section 58 to send out the Path message for the protection path set up. The signaling control section 58 creates the Path message. The Path message is set up to carry the value of the delay from the ingress node (delay of 10 ms from ingress to node B+output port delay of 10 ms=20 ms) and the working path ID (172.27.170.1+1), PSL node ID (172.27.171.1), PSL working path output port number (1), and bypassed node ID (172.27.172.1) as the bandwidth share information. Further, since the next node along the working path is an ABR (the next node is recognized as an ABR by the existing OSPF technology), the bypassed ABR node ID is set as (172.27.172.1), and a transmit request is issued to the signal interface unit 48. In this way, the Path message sent out from the node B, i.e., the PSL node, reaches the node H, an ABR node, via the node G.

The Path message sent out from the PSL node B is received at the signal interface unit 48 in the ABR node H, is passed through the signaling control section 58 and protection path setup/release control section 66, and reaches the route determining section 72 via the path setup/release control section 60. The operation up to this point is the same as that already described, and therefore, a description will not be repeated here. The path setup/release control section 60 activates the route determining section 72 to determine the route from the ABR to the PML. When the current node is an ABR node, the route determining section 72 extracts the bypassed ABR (172.27.172.1) reported from the node B, determines the optimum route to the PML node D by bypassing the ABR node C in accordance with the prior art, and returns the result to the path setup/release control section 60. Thereafter, the resource check and other operations are performed, and the Path message is transmitted out; these operations have already been described, and the description of them will not be repeated here. The protection path Path message thus sent out from the ABR node H reaches the PML node D via the node I.

The Path message sent out from the ABR node H is received at the signal interface unit 48 in the PML node D, is passed through the signaling control section 58 and protection path setup/release control section 66, and reaches the resource control section 64 via the path setup/release control section 60. The operation up to this point is the same as that already described, and therefore, a description will not be repeated here. The path setup/release control section 60 activates the resource control section 64 in order to check the end-to-end delay of the protection path. The resource control section 64 activates the protection path delay calculating section 70 and requests it to calculate the end-to-end delay of the protection path. The protection path delay calculating section 70 calculates the end-to-end delay. The delay of the working path from the ingress can be retrieved from the path management information table 95 of FIG. 24, which shows that the delay is 30 ms. The end-to-end delay of the working path can also be retrieved from the path management information table 95, which shows that the end-to-end delay is 40 ms. Accordingly, the delay from the current node to the egress node is given as 40 ms−30 ms=10 ms. The delay of the protection path from the ingress node to the current node can also be retrieved from the path management information table 95, which shows that the delay is 50 ms. Accordingly, the end-to-end delay of the protection path is given as 10 ms+50 ms=60 ms. The protection path delay calculating section 70 returns the result to the resource control section 64. The resource control section 64 compares it with the delay requirement of 100 ms, determines that the delay requirement is satisfied, and notifies the path setup/release control section 60 accordingly. The path setup/release control section 60 activates the label control section 62 to perform label assignment. After seizing the label, the label control section 62 performs label merging to the working path in accordance with the existing technique and, after setting up the merge information in the switch unit 50, notifies the path setup/release control section 60.

Thereafter, the Resv message is transmitted out, the procedure for which is the same as that for the working path performed at the egress node, and therefore, will not be described herein. The end-to-end delay when the protection path is used can be calculated as described above.

The Resv message sent out from the PML node D reaches the PSL node B via the nodes I, H, and G in this order.

The signaling control section 58 at the PSL node B receives the message via the signal interface unit 48, and notifies it to the protection path setup/release control section 66. The protection path setup/release control section 66 notifies the path setup/release control section 60 of the receipt of the Resv message. The path setup/release control section 60 initiates the processing for the received protection path Resv message. In the Resv message processing procedure, first a request is made to the resource control section 64 to secure the resources for the protection path. The resource control section 64 activates the bandwidth share judging section 68 for bandwidth sharing. The operation of the bandwidth share judging section 68 will be described later. As a result of the bandwidth share check, if the bandwidth needs to be increased, the resource control section 64 checks to see if the required bandwidth is available from the unused bandwidth. This check was done when the Path message was received but, as there is the possibility of contention, the check is done once again when the Resv message is received. The bandwidth securing procedure has already been described, and therefore, will not be described here. Thereafter, the result is sent to the path setup/release control section 60. The path setup/release control section 60 enters the end-to-end delay value, carried in the Resv message, into the path management information table 95 of FIG. 24 and sets the path state in the table to "communicating". Finally, it notifies the protection path setup/release control section 66 of the completion of the protection path setup. When the protection path completion notification is received, the protection path setup/release control section 66 sets the protection path setup completion in the working/protection status management table 102 of FIG. 36. Next, the protection path setup/release control section 66 refers to the working/protection status management table 102 to check whether the protection result notification from the downstream node has been received or not; if it has been received, a request is made to the signaling control section 58 to send out the protection result notification. If the protection result notification arrives later than the protection path setup completion notification then, upon the receipt of the protection result notification, a request is issued to the signaling control section 58 to send out the protection result notification.

As described above, the protection path setup is performed at each node along which the working path has been established, and the protection result notification is passed to the upstream node; in this way, the protection path setup is completed, and the protection result notification finally arrives at the ingress node.

Alternatively, when the working path Resv message arrives at each node, the node may first perform the protection path setup, and then notify the upstream node of the result of the protection path setup by including it in the working path Resv message, but the problem in this case is that it takes time to complete the protection path setup, because the nodes cannot initiate the protection path setup in a parallel fashion.

The signaling control section 58 at the ingress node A receives the message via the signal interface unit 48, and notifies it to the protection path setup/release control section 66. If it is the protection path setup completion notification, the protection path setup/release control section 66 passes the path setup result to the request readout/result notification section 57. The request readout/result notification section 57 notifies the maintenance personnel via the command interface unit 52.

Next, assuming the presence of the working and protection paths thus established, procedures for releasing the working and protection paths will be described in detail below.

When a working/protection path release request is entered by maintenance personnel, the ingress node transmits a working path Path message toward the egress node by appending "protection not-needed" information to it. The working path Path message transmission method has already been described, and therefore, will not be described here. The difference from the previously described procedure is that at each node that received the Path message, the "protection needed/not-needed state" in the path management information table 95 of FIG. 24 is set to "protection not needed". The Path message sent out from the ingress node A reaches the egress node E via the nodes B, C, and D in this order. The egress node returns a Resv message in response to the Path message; at this time, the path setup/release control section 60 notifies the protection path setup/release control section 66 of the completion of the working path setup, as in the previously described procedure. When the protection state shows "protection not-needed", and when the current node is the egress node, the protection path setup/release control section 66 requests the signaling control section 58 to send out a protection result notification (release). The signaling control section 58 sends out the protection result notification in the same manner as previously described.

The Resv message sent out from the egress node E reaches the ingress node A via the nodes D, C, and B in this order. Every node from the node D to the ingress node A performs the protection path release procedure triggered by the receipt of the working Path Resv message, but the following description is given by taking the node B as an example.

When the working path Resv message is received, the node B passes the Resv message to the upstream node as described previously; at this time, the path setup/release control section 60 notifies the protection path setup/release control section 66 of the completion of the working path setup, as described earlier. When the protection status shows "protection not-needed", and when the current node is any node other than the egress node, the protection path setup/release control section 66 requests the path setup/release control section 60 to release the protection path. The path setup/release control section 60 requests the signaling control section 58 to send out a PathTear message. The signaling control section 58 creates the PathTear message and passes it to the signal interface unit 48. The format of the PathTear message is the same as that used in the prior art, and will not be shown here. The PathTear message thus sent out from the PSL node B reaches the PML node D via the nodes G, H, and I in this order.

The signaling control section 58 at the PML node D receives the message via the signal interface unit 48, and notifies it to the protection path setup/release control section 66. The protection path setup/release control section 66 notifies the path setup/release control section 60 of the receipt of the PathTear message, and requests it to release the path. The path setup/release control section 60 activates the label control section 62 and requests it to release the label. The label control section 62, after clearing the switch information in the switch unit 50, releases the label and returns the process to the path setup/release control section 60. The path setup/release control section 60 notifies the signaling control section 58 to send out a protection path ResvTear message. The signaling control section 58 creates the ResvTear message and passes it to the signal interface unit 48. Next, the path setup/release control section 60 clears the path management information table 95, and releases the currently used LSP_ID by indexing the LSP_ID management table 94. Then, the path setup/release control section 60 notifies the protection path setup/release control section 66 of the completion of the protection path release. The ResvTear message thus sent out from the PML node D reaches the PSL node B via the nodes I, H, and G in this order.

The signaling control section 58 at the PSL node B receives the ResvTear message via the signal interface unit 48, and notifies it to the protection path setup/release control section 66. The protection path setup/release control section 66 notifies the path setup/release control section 60 of the receipt of the ResvTear message. The path setup/release control sect on 60 activates the resource control section 64, and requests it to release the resources. The resource control section 64 initiates the processing for the received protection path ResvTear message. The resource control section 64 activates the bandwidth share judging section 68, and requests it to release the bandwidth share. The operation of the bandwidth share judging section 68 will not be described here, but will be described later. If there is a need to release the bandwidth of the output port as a result of releasing the bandwidth share, the resource control section 64 updates the unused bandwidth entry in the bandwidth/delay management table 100 accordingly. Next, after clearing the path management information table and the LSP_ID management table, the path setup/release control section 60 notifies the protection path setup/release control section 66 of the completion of the protection path release. The protection path setup/release control section 66 sets the received protection path release completion notification in the working/protection status management table. Next, if the protection result notification has already been received, the protection path setup/release control section 66 requests the signaling control section 58 to send out a protection result notification (release) to notify the upstream node of the completion of the protection path release. The processing performed by the signaling control section 58 has already been described, and the description will not be repeated here. In this way, by releasing the protection path at each node along the route of the working path, and passing the protection result notification (release) to its upstream node, all the protection paths are released and the protection result notification (release) reaches the ingress node.

The ingress node A also performs the protection path release, the procedure for which is the same as that performed at other nodes and, therefore, will not be described here. The signaling control section 58 at the ingress node A receives the protection result notification (release) via the signal interface unit 48, and notifies it to the protection path setup/release control section 66. The protection path setup/release control section 66 sets the received protection result notification (release) in the working/protection status management table. Next, if the releasing of the protection path established by the current node has been completed, a working path release request is issued to the path setup/release control section 60. The path setup/release control section 60 requests the signaling control section 58 to send out a PathTear message for the working path. The processing performed by the signaling control section 58 has already been described, and the description will not be repeated here.

The working path PathTear message thus sent out from the ingress node reaches the egress node E via the nodes B, C, and D in this order. The egress node E returns a working path ResvTear message to the ingress node, the procedure for which is well known in the art and will not be described here.

The signaling control section 58 at the ingress node A receives the working path ResvTear message via the signal interface unit 48, and notifies it to the protection path setup/release control section 66. The protection path setup/release control section 66 notifies the path setup/release control section 60 of the receipt of the working path ResvTear message. The path setup/release control section 60 activates the resource control section 64, and requests it to release the resources. The resource control section 64 initiates the processing for the received working path ResvTear message. The resource control section 64 updates the unused bandwidth entry in the bandwidth/delay management table 100. Next, after clearing the path management information table 95 and the LSP_ID management table 94, the path setup/release control section 60 notifies the protection path setup/release control section 66 of the completion of the working path release. When the working path release completion notification is received, the protection path setup/release control section 66 reports the path release result to the request readout/result notification section 57. The request readout/result notification section 57 notifies the result to the maintenance personnel via the command interface unit 52.

In this way, the protection path can be automatically released at each node, triggered by the working path release request entered by the maintenance personnel.

Next, assuming that the previously established protection paths (FIG. 8) are the first protection paths in the network, a description will be given of how a protection path, being established in a synchronized fashion with another new working path, can be set up to share the bandwidth with one of the previously established protection paths. Bandwidth sharing can be accomplished on every link along which two or more protection paths are routed, but in this embodiment, the description will be given by focusing on the link between the nodes B and G.

Figure 37:
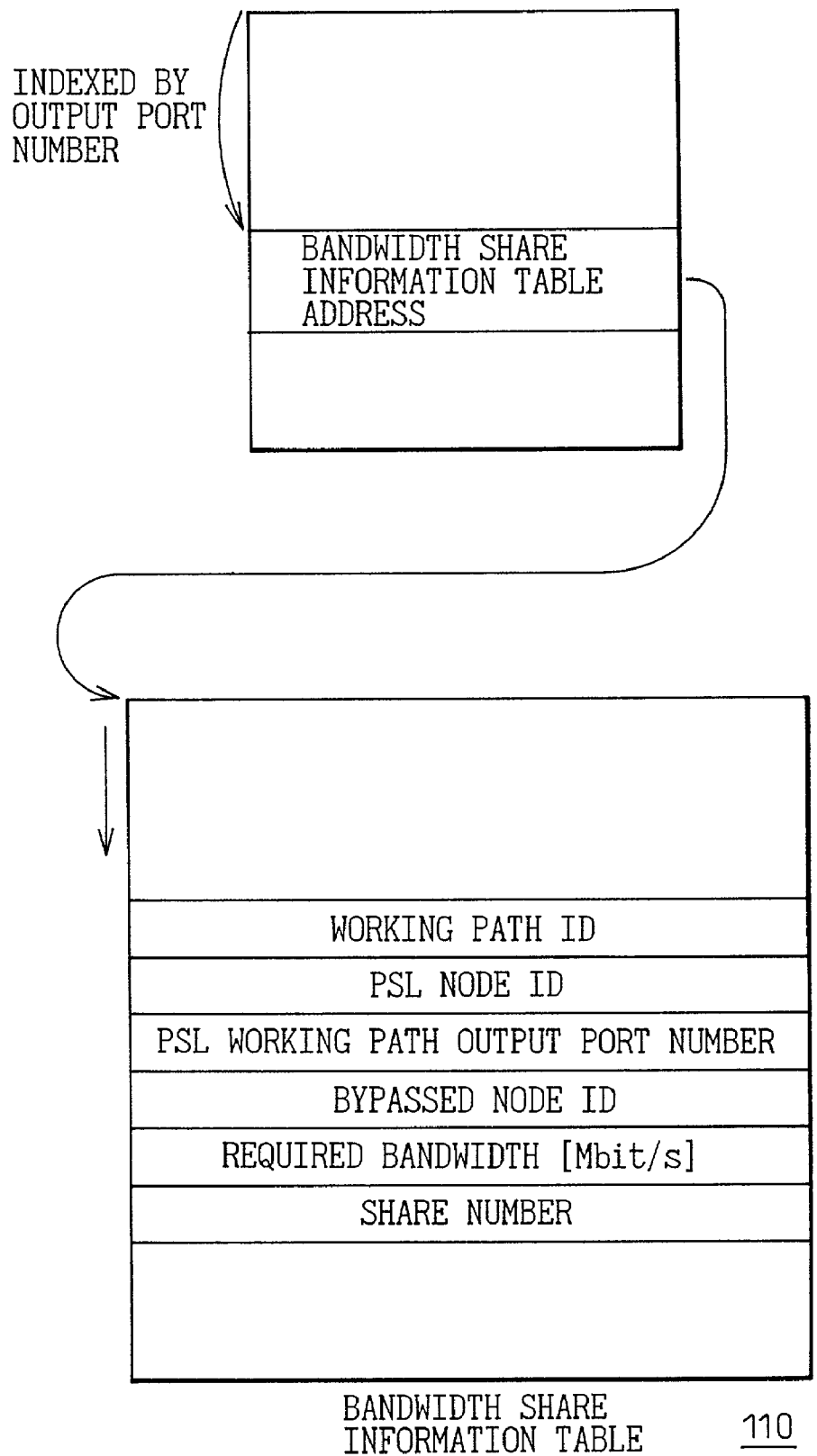
FIG. 37 is a diagram showing a bandwidth share information table.

First, as previously described, when setting up a working path between the ingress node A to the egress node E, each node along the route of the working path sets up a protection path. As previously described, the node B initiates the protection path setup procedure triggered by the receipt of the working path Resv message. At the node B, the path setup/release control section 60 requested by the protection path setup/release control section 66 to set up a protection path activates the resource control section 64. The resource control section 64 first checks the delay requirement. The delay requirement check procedure has already been described, and the description will not be repeated here. Next, the resource control section 64 activates the bandwidth share judging section 68 to determine whether bandwidth sharing is possible or not. First, based on the output port number, the bandwidth share judging section 68 determines the corresponding bandwidth share information table 110 (FIG. 37). Next, using the working path ID (172.27.170.1+1), PSL node ID (172.27.171.1), PSL working path output port number (1), and bypassed node ID (172.27.172.1) as the bandwidth share information, the bandwidth share information table 110 is searched by imposing the condition that neither of the following two conditions are satisfied.

(1) Bypassed node is the same as that for the path about to be set up.

(2) PSL node ID and PSL working path output number are the same as those for the path about to be set up, but the working path ID is different.

Since the path about to be set up here is the first protection path, as earlier noted, there is no other path with which the bandwidth can be shared, so that the resource control section 64 is notified that the bandwidth must be increased to provide the required bandwidth of 100 Mbit/s. Since it is determined that the bandwidth needs to be increased as a result of the bandwidth share check, the resource control section 64 checks to see if the required bandwidth of 100 Mbit/s is available from the unused bandwidth, and reports the result to the path setup/release control section 60. Thereafter, processing for the transmission of the protection path Path message is performed, but the procedure has already been described and will not be described here.

Figure 38:
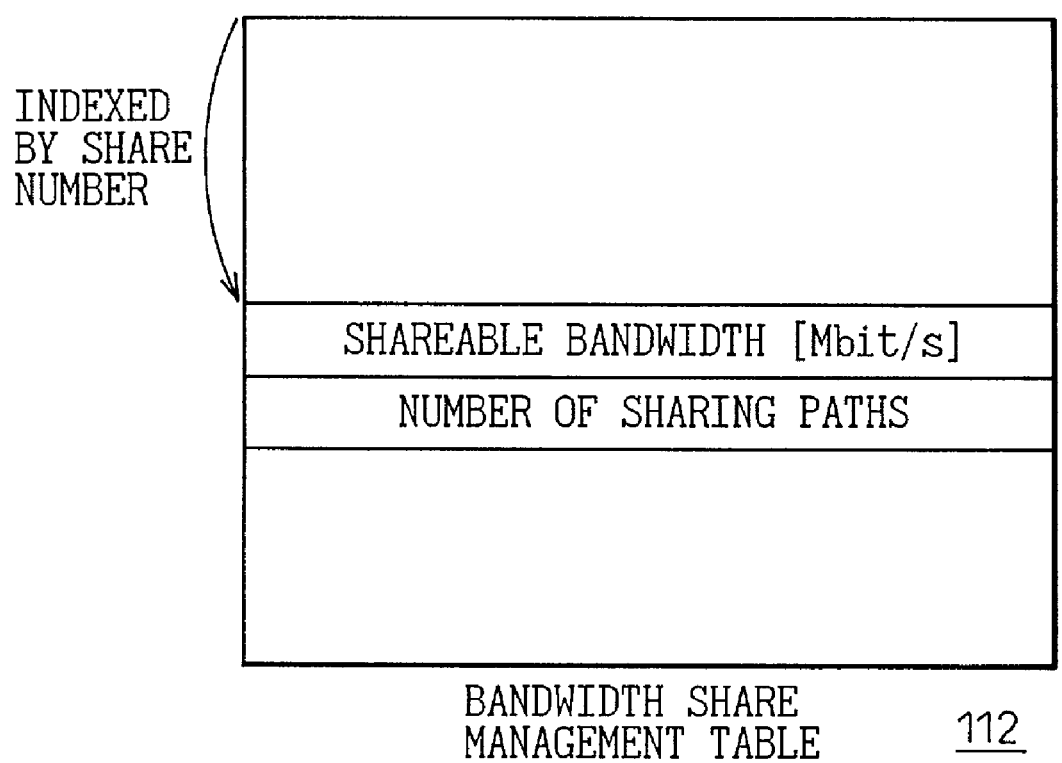
FIG. 38 is a diagram showing a bandwidth share management table.

Next, a description will be given of the operation when the protection path Resv message is received at the node B. When the Resv message is received, the path setup/release control section 60 notified by the protection path setup/release control section 66 of the receipt of the protection path Resv message activates the resource control section 64, as already described. The resource control section 64 activates the bandwidth share judging section 68 for bandwidth sharing. In the same manner as when the Path message was received, the bandwidth share judging section 68 searches for a path with which the bandwidth can be shared. Since the path to be set up here is the first protection path, as earlier noted, there is no other path with which the bandwidth can be shared; therefore, a share number is seized, and the working path ID (172.27.170.1+1), PSL node ID (172.27.171.1), PSL working path output port number (1), and bypassed node ID (172.27.172.1) as the bandwidth share information are set up in the bandwidth share information table 110 of FIG. 37, together with the required bandwidth of 100 Mbit/s and the share number. Next, the bandwidth share management table 112 shown in FIG. 38 is indexed using the share number, and the required bandwidth of 100 Mbit/s is set as the shareable bandwidth and the number of sharing paths is set to 1; then, the resource control section 64 is notified that the bandwidth needs to be increased to provide the required bandwidth of 100 Mbit/s. Since it is determined that the bandwidth needs to be increased as a result of the bandwidth share check, the resource control section 64 secures the required bandwidth of 100 Mbit/s from the unused bandwidth, and notifies the path setup/release control section 60 accordingly. Thereafter, processing for the transmission of the protection path Resv message is performed, but the procedure has already been described and will not be described here.

As described above, when the protection path is set up as the first protection path, the bandwidth cannot be shared but only the setup of the bandwidth share information table 110 and bandwidth share management table 112 is performed.

Next, a description will be given of how a protection path being established in synchronized fashion with another new working path can be set up to share the bandwidth with the first established protection path.

Figure 39:
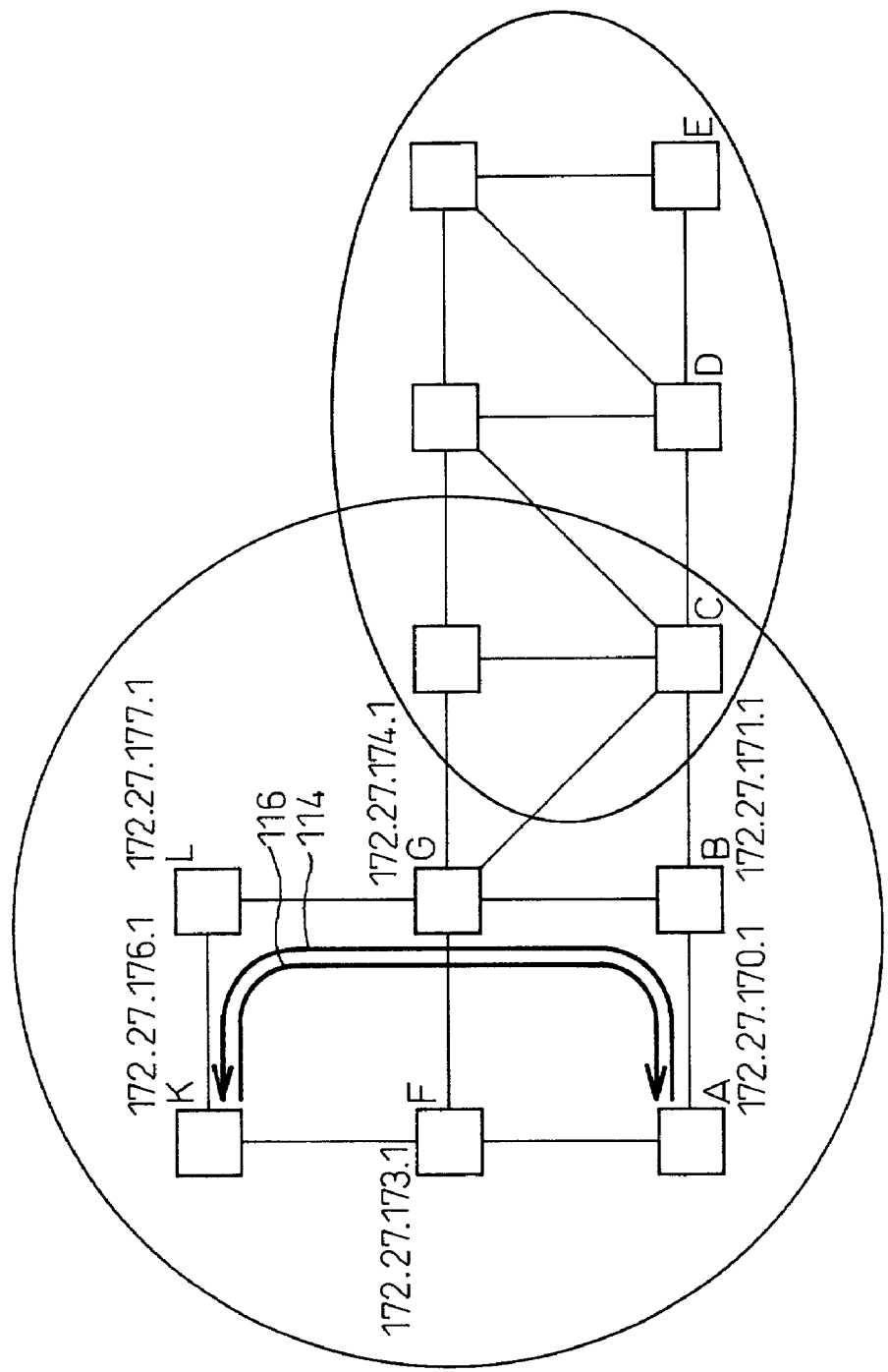
FIG. 39 is a diagram for explaining a bandwidth sharing procedure.

The bandwidth sharing procedure performed at the node B will be described below by assuming that when setting up a working path from the node A to the node K, as shown in FIG. 39, a protection path from the node A to the node K is set up by passing through the nodes B, G, and L in this order. The protection path Path message 114 sent out from the node A carries the working path ID (ingress node ID (172.27.170.1)+LSP_ID (3)), PSL node ID (node A (172.27.170.1)), PSL working path output port number (5), and bypassed node ID (node F (172.27.173.1)) as the bandwidth share information; it is assumed here that the required bandwidth is 200 Mbit/s.

When the protection path Path message is received at the node B, the path setup/release control section 60 requested by the protection path setup/release control section 66 to set up a protection path activates the resource control section 64. The resource control section 64 first checks the delay requirement. The delay requirement check procedure has already been described, and the description will not be repeated here. Next, the resource control section 64 activates the bandwidth share judging section 68 to determine whether bandwidth sharing is possible or not. First, based on the output port number, the bandwidth share judging section 68 determines the corresponding bandwidth share information table 110. Next, using the working path ID (172.27.170.1+3), PSL node ID (172.27.171.1), PSL working path output port number (5), and bypassed node ID (172.27.173.1) as the bandwidth share information, the bandwidth share information table 110 is searched by imposing the previously described condition. Here, since the bandwidth share information for the previously established protection path is already registered in the bandwidth share information table 110, there is a shareable share number. Next, the bandwidth share judging section 68 extracts the shareable bandwidth by indexing the bandwidth share management table 112 using the share number. Since the bandwidth of the previously established protection path is 100 Mbit/s, 100 Mbit/s is extracted as the shareable bandwidth. On the other hand, the required bandwidth of the protection path to be set up here is 200 Mbit/s which is larger than the previously set shareable bandwidth of 100 Mbit/s; as a result, the resource control section 64 is notified that the bandwidth needs to be increased by 100 Mbit/s (required bandwidth 200 Mbit/s—shareable bandwidth 100 Mbit/s). Since it is determined that the bandwidth needs to be increased as a result of the bandwidth share check, the resource control section 64 checks to see if the additionally required bandwidth of 100 Mbit/s is available from the unused bandwidth, and reports the result to the path setup/release control section 60. Thereafter, the protection path Path message is forward up to the node K, but the procedure will not be described here as it has already been described.

Next, a description will be given of the operation when the protection path Resv message 116 sent out from the node K is received at the node B. When the Resv message is received, the path setup/release control section 60 notified by the protection path setup/release control section 66 of the receipt of the protection path Resv message activates the resource control section 64, as in the earlier described case. The resource control section 64 activates the bandwidth share judging section 68 for bandwidth sharing. In the same manner as when the Path message was received, the bandwidth share judging section 68 searches for a path with which the bandwidth can be shared. Here, since the bandwidth share information for the previously established protection path is already registered in the bandwidth share information table 110, there is a shareable share number. Next, the bandwidth share judging section 68 sets the working path ID (172.27.170.1+3), PSL node ID (172.27.171.1), PSL working path output port number (5), and bypassed node ID (172.27.173.1) as the bandwidth share information in the bandwidth share information table 110 together with the required bandwidth of 200 Mbit/s and the share number. Next, the shareable bandwidth is extracted by indexing the bandwidth share management table 112 using the share number. Since the required bandwidth of the protection path to be set up here is 200 Mbit/s which is larger than the previously set shareable bandwidth of 100 Mbit/s, 200 Mbit/s is set as the shareable bandwidth in the bandwidth share management table 112, and the number of sharing paths is incremented by 1. Then, the resource control section 64 is notified that the bandwidth needs to be increased by 100 Mbit/s (required bandwidth 200 Mbit/s—shareable bandwidth 100 Mbit/s). Since it is determined that the bandwidth needs to be increased as a result of the bandwidth share check, the resource control section 64 secures the additionally required bandwidth of 100 Mbit/s from the unused bandwidth, and notifies the path setup/release control section 60 accordingly. Thereafter, processing for the transmission of the protection path Resv message is performed.

In this way, bandwidth sharing can be automatically accomplished at each node when setting up a protection path.

Next, a description will be given of the bandwidth share release operation performed when releasing the protection path. The following description is given by taking as an example the case where the 200 Mbit/s protection path established between the nodes A and K is released first, and then the 100 Mbit/s protection path established between the nodes B and D is released.

First, the releasing of the newly established protection path will be described. As in the earlier described case, the protection path PathTear message sent out from the node A reaches the node K via the nodes B, G, and L in this order. Next, the node K sends out a ResvTear message along the same route but in the opposite direction. When the protection path ResvTear message sent out from the node K is received at the node B, the path setup/release control section 60 notified by the protection path setup/release control section 66 of the receipt of the protection path ResvTear message activates the resource control section 64, as in the earlier described case. The resource control section 64 activates the bandwidth share judging section 68 to release the bandwidth share. First, based on the output port of the protection path, the bandwidth share judging section 68 determines the corresponding bandwidth share information table 110. Next, using the working path ID (172.27.170.1+3), the bandwidth share information table 110 is searched, and the required bandwidth 200 Mbit/s of the matching working path ID and its share number are extracted. Then, the bandwidth share management table 112 is indexed using the extracted share number, and the shareable bandwidth of 200 Mbit/s and the number of sharing paths "2" are extracted. At the time of releasing this protection path, the number of sharing paths set in the bandwidth share management table 112 is 2 and, as the extracted required bandwidth and the extracted shareable bandwidth are the same, the bandwidth share information table 110 is searched using the extracted share number, to extract the required bandwidth of 100 Mbit/s (new shareable bandwidth) closest to the extracted required bandwidth. Next, the area in the bandwidth share information table 110 corresponding to the working path ID is cleared. Further, the new shareable bandwidth of 100 Mbit/s is set in the bandwidth share information table 110, and the number of sharing paths is decremented by 1. Finally, the bandwidth that needs to be released, i.e., old shareable bandwidth 200 Mbit/s—new shareable bandwidth 100 Mbit/s=100 Mbit/s, is reported to the resource control section 64. Since it is determined that bandwidth needs to be released as a result of the bandwidth share release, the resource control section 64 releases the bandwidth of 100 Mbit/s, and notifies the path setup/release control section 60 accordingly. Thereafter, processing for the transmission of the protection path ResvTear message is performed, but the procedure has already been described and will not be described here.

The invention claimed is:

1. A protection path setup method comprising the steps of:
 (a) setting up a working path from a start-point node to an end-point node; and
 (b) setting up a plurality of protection paths by taking a plurality of nodes on said working path as respective start points at the time of setting up said working path, wherein
 step (a) includes the substeps of:
 transferring a working path setup request message containing therein a protection path request from a start point to an end point of said working path along a route of said working path being set up; and
 setting up said working path by transferring a working path setup response message from the end point to the start point of said working path in response to said working path setup request message, and step (b) includes the substeps of:
 transferring a protection path setup request message from a start point to an end point of each of said plurality of protection paths in response to said protection path request contained in said working path setup request message; and
 setting up each of said plurality of protection paths by transferring a protection path setup response message from the end point to the start point of said each protection path in response to said protection path setup request message.

2. A method according to claim 1, wherein said protection path setup request message is sent out from each node after said each node has received said working path setup response message.

3. A method according to claim 2, wherein
 step (b) further includes the substeps of:
 sending a result notification from said end-point node of said working path to an upstream adjacent node along said working path; and
 notifying the completion of said protection path setup to said start-point node of said working path, by each node on said working path sequentially passing said result notification on to an upstream adjacent node along said working path after receiving both said result notification and said protection path setup response message for the protection path set up with said each node as the start point.

4. A method according to claim 2, wherein step (b) further includes the substep of determining whether a portion of a protection path about to be set up can share a bandwidth with some other protection path.

5. A method according to claim 2, wherein step (b) further includes the substep of estimating a delay along a route from the stan point to the end point of said working path, including the protection path about to be set up, at the end-point node of said protection path.

6. A method according to claim 2, wherein step (a) further includes the substep of appending at each node an identifier of said each node to said working path setup response message, thereby making it possible to set up a protection path across an area border.

7. A method according to claim 1, further comprising the steps of:
 (c) releasing said plurality of protection paths that have been set up in step (b); and
 (d) releasing said working path that has been set up in step (a).

8. A node apparatus comprising:
 means for setting up a working path with its own node as a start point; and
 means for setting up a protection path with its own node as a start point during the setting up of said working path, wherein
 said working path setup means includes:
 means far sending out a working path setup request message containing therein a protection path request for delivery to an end point of said working path alone the route of said working path being set up; and
 means for sending up said working path by receiving a working path setup response messaee returned in response to said working path setup request message; and
 said protection path setup means includes:
 means for sending out a protection path setup request message; and means for setting up said protection path by receiving a protection path setup response message returned in response to said protection path setup request message.

9. A node apparatus according to claim 8, wherein said protection path setup request message is sent out after receiving said working path setup response message.

10. A node apparatus according to claim 8, wherein said protection path setup means further includes means for determining whether a portion of the protection path about to be set up can share a bandwidth with some other protection path.

11. A node apparatus according to claim 8, further comprising:
    means for releasing said protection path set up by said protection path setup means; and
    means for releasing said working path set up by said working path setup means.

12. A node apparatus comprising:
    means for setting up a working path passing through its own node; and
    means for setting up a protection path with its own node as a start point during the setting up of said working path, wherein
    said working path setup means includes:
    means for transferring a working path setup reauest message containing therein a protection path reguest and being forwarded from a start point toward an end point of said working path along the route of said working path being set up; and
    means for setting up said working path by transferring a working path setup response message being returned from the end point toward the start point of said working path in response to said working path setup request message, and
    said potection path setup means includes:
    means for sending out a protection path setup request message in response to said protection path request contained in said working path setup request message; and
    means for setting up said protection path by receiving a protection path setup response message returned in response to said protection path setup request message.

13. A node apparatus according to claim 12, wherein said protection path setup request message is sent out after receiving said working path setup response message.

14. A node apparatus according to claim 12, wherein said protection path setup means includes:
    means for receiving a result notification being transferred from the end-point node of said working path; and
    means for passing said result notification on to an upstream adjacent node along said working path after receiving both said result notification and said protection path setup response message.

15. A node apparatus according to claim 12, wherein said protection path setup means further includes means for determining whether a portion of the protection path about to be set up can share a bandwidth with some other protection path.

16. A node apparatus according to claim 12, wherein said protection path setup means further includes means for estimating a delay along a route from the start point to the end point of said working path including the protection path about to be set up.

17. A node apparatus according to claim 12, wherein said working path setup means further includes means for appending an identifier of its own node to said working path setup response message, thereby making it possible to set up a protection path across an area border.

18. A node apparatus according to claim 12, further comprising:
    means for releasing said protection path set up by said protection path setup means; and
    means for releasing said working path set up by said working path setup means.

19. A node apparatus comprising:
    means for setting up a working path with its own node as an end point; and
    means for setting up a protection path with its own node as an end point during the setting up of said working path, wherein
    said working path setup means includes:
    means for receiving working path setup request message containing therein a protection path request and transmitted from a start point of said working path alone the route of said working path being set up; and
    means for setting up said working path by transmitting a working path setup response message toward the start point of said working path in response to said working path setup request message, and
    said protection path setup means includes:
    means for receiving a protection path setup request message transmitted from a start point of said protection path in response to the protection path request contained in said working path setup request message; and
    means for setting up said protection path by transmitting a protection path setup response message toward the start point of said protection path in response to said protection path setup request message.

20. A node apparatus according to claim 19, wherein said working path setup means further includes means for sending a result notification to an upstream adjacent node along said working path.

21. A node apparatus according to claim 19, wherein said working path setup means further includes means for appending an identifier of its own node to said working path setup response message, thereby making it possible to set up a protection path across an area border.

22. A node apparatus according to claim 19, further comprising:
    means for releasing said protection path set up by said protection path setup means; and
    means for releasing said working path set up by said working path setup means.

* * * * *